United States Patent
Imai et al.

(10) Patent No.: US 11,063,767 B2
(45) Date of Patent: Jul. 13, 2021

(54) APPARATUS AND METHOD TO PERFORM SECURE DATA SHARING IN A DISTRIBUTED NETWORK BY USING A BLOCKCHAIN

(71) Applicant: FUJITSU LIMITED, Kawasaki (JP)

(72) Inventors: Satoshi Imai, Kawasaki (JP); Toru Katagiri, Kawasaki (JP); Motoyoshi Sekiya, Chigasaki (JP)

(73) Assignee: FUJITSU LIMITED, Kawasaki (JP)

( * ) Notice: Subject to any disclaimer, the term of this patent is extended or adjusted under 35 U.S.C. 154(b) by 269 days.

(21) Appl. No.: 15/795,800

(22) Filed: Oct. 27, 2017

(65) Prior Publication Data
US 2018/0139056 A1    May 17, 2018

(30) Foreign Application Priority Data
Nov. 15, 2016   (JP) .............................. JP2016-222778

(51) Int. Cl.
*H04L 29/06* (2006.01)
*H04L 9/32* (2006.01)
(Continued)

(52) U.S. Cl.
CPC .......... *H04L 9/3247* (2013.01); *H04L 9/0637* (2013.01); *H04L 9/14* (2013.01);
(Continued)

(58) Field of Classification Search
CPC ... H04L 9/0637; H04L 9/3247; H04L 9/0643; H04L 9/3239; H04L 9/14; H04L 9/30;
(Continued)

(56) References Cited

U.S. PATENT DOCUMENTS

2008/0014931 A1* 1/2008 Yared ................ H04L 29/12122
455/432.3
2009/0034740 A1† 2/2009 Gentry
(Continued)

FOREIGN PATENT DOCUMENTS

JP    2011-70557      4/2011
JP    2013-105227     5/2013
(Continued)

OTHER PUBLICATIONS

Ricardo Salmon et al., Simulating a file sharing system based on BitTorrent, Apr. 2008, ACM, pp. 1-5. (Year: 2008).*
(Continued)

*Primary Examiner* — Luu T Pham
*Assistant Examiner* — Fahimeh Mohammadi
(74) *Attorney, Agent, or Firm* — Staas & Halsey LLP

(57) ABSTRACT

An apparatus serves as a node device included in a distributed data sharing network, and shares, by using a blockchain, a piece of event information related to an event generated in a terminal, among node devices included in the distributed data sharing network, where the blockchain is a continuously growing list of blocks which are linked and secured using cryptography. The apparatus generates a piece of event data including the piece of event information related to the event, and causes the generated piece of event data to be stored in one of the node devices included in the distributed data sharing network.

7 Claims, 15 Drawing Sheets

(51) Int. Cl.
 *H04L 9/30* (2006.01)
 *H04L 9/14* (2006.01)
 *H04L 9/06* (2006.01)

(52) U.S. Cl.
 CPC .............. *H04L 9/30* (2013.01); *H04L 9/3236* (2013.01); *H04L 9/3297* (2013.01); *H04L 2209/38* (2013.01)

(58) Field of Classification Search
 CPC .. H04L 9/3236; H04L 9/3297; H04L 2209/38
 See application file for complete search history.

(56) References Cited

U.S. PATENT DOCUMENTS

| | | | | |
|---|---|---|---|---|
| 2010/0325732 | A1* | 12/2010 | Mittal | H04L 63/065 726/26 |
| 2015/0262137 | A1* | 9/2015 | Armstrong | G06Q 20/3678 705/41 |
| 2015/0356690 | A1* | 12/2015 | Celikyilmaz | G06Q 40/12 705/30 |
| 2015/0379510 | A1* | 12/2015 | Smith | G06Q 20/3829 705/71 |
| 2016/0267575 | A1* | 9/2016 | Garcia | H04L 67/10 |
| 2016/0283920 | A1* | 9/2016 | Fisher | H04L 9/3297 |
| 2017/0005804 | A1* | 1/2017 | Zinder | G06F 16/219 |
| 2017/0076109 | A1* | 3/2017 | Kaditz | G06F 16/122 |
| 2017/0177855 | A1* | 6/2017 | Costa Faidella | H04L 9/3236 |
| 2017/0206522 | A1* | 7/2017 | Schiatti | G06Q 50/06 |
| 2017/0236123 | A1* | 8/2017 | Ali | G06Q 20/3825 705/75 |
| 2017/0279774 | A1* | 9/2017 | Booz | G06Q 20/123 |
| 2018/0089644 | A1* | 3/2018 | Chen | G06Q 20/24 |
| 2019/0158470 | A1* | 5/2019 | Wright | G06Q 20/065 |

FOREIGN PATENT DOCUMENTS

| | | |
|---|---|---|
| JP | 2016-170530 | 9/2016 |
| WO | 2017090041 † | 6/2017 |

OTHER PUBLICATIONS

Stephen Voida et al., Share and Share Alike: Exploring the User Interface Affordances of File Sharing, Apr. 22-27, 2006, ACM, pp. 221-230. (Year: 2006).*

Asaph Azaria at al., MedRec: Using Blockchain for Medical Data Access and Permission Management, Aug. 22-24, 2016, IEEE, pp. 25-30. (Year: 2016).*

Huasong Wang et al., Design of IMS-based P2P File-sharing System Architecture, Dec. 3-5, 2009, IEEE, pp. 573-576. (Year: 2009).*

Takashi Nagai et al., "A Global Sharing of Wireless Sensor Network Using a Hierarchical Peer-to-Peer Network", IEICE Technical Report, vol. 109, No. 362, Jan. 2010, The Institute of Electronics, Information and Communication Engineers, p. 83-88.

Japanese Office Action dated May 21, 2019 in corresponding Japanese Patent Application No. 2019-022382.

Japanese Office Action dated Dec. 11, 2018 for corresponding Japanese Patent Application No. 2016-222778.

\* cited by examiner
† cited by third party

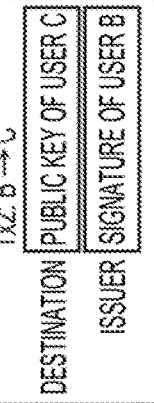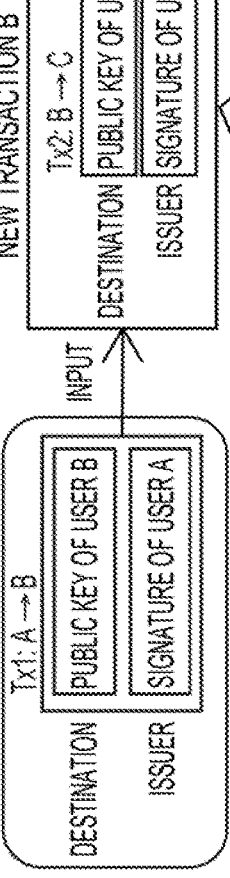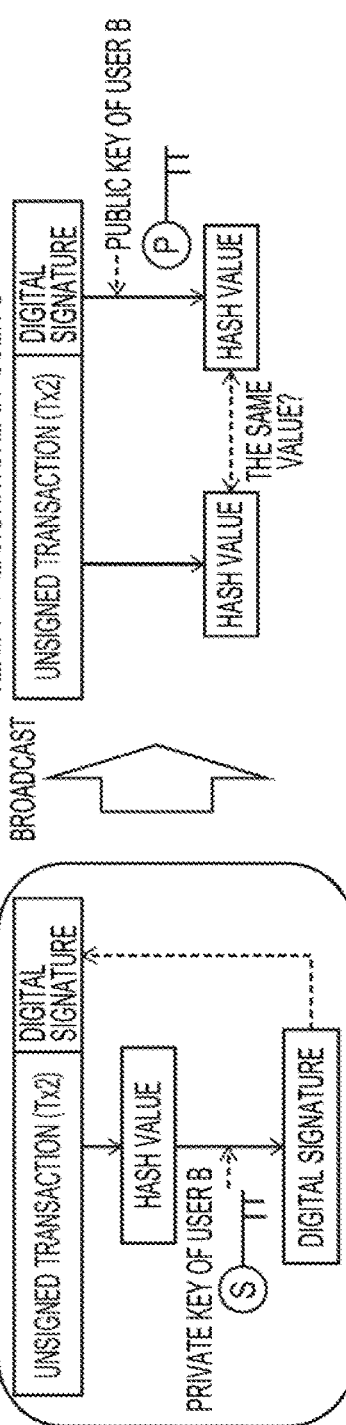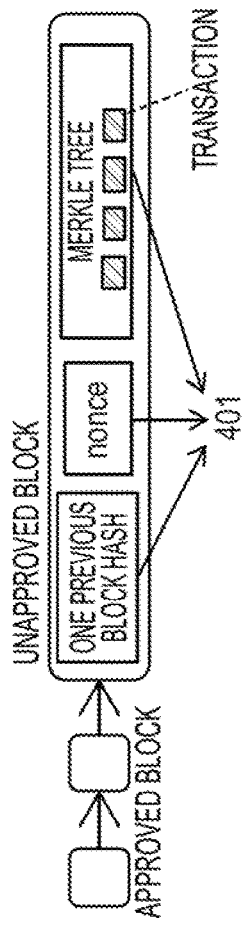

FIG. 8

| SERVICE CONTENT | FILE NAME | HASH VALUE (ADDRESS INFORMATION) OF EVENT INFORMATION FILE |
|---|---|---|
| sample1 | sample1.csv | QmaZuSmfT9bxj3nN4USDCTW9FG6xgzj73rZBQ3oAEQnWq |
| sample2 | sample2.html | QmRvPJi7GmNAFbJnVeEEhMCGtJsDEaJYVa4a52J9bqn1AN |
| sample3 | sample3.pdf | QmPw7VyqirNpx2N2fcT7B8nBFbe1Pq7td3P1uyK6gKSYv7 |
| ⋯⋯⋯ | | |
| New_sample | New_sample.txt | QmYkwheqFpZE1LozCFYLsAWp2g8pf5dD1aVTitMTTEPEQ9 |

APPARATUS AND METHOD TO PERFORM SECURE DATA SHARING IN A DISTRIBUTED NETWORK BY USING A BLOCKCHAIN

CROSS-REFERENCE TO RELATED APPLICATION

This application is based upon and claims the benefit of priority of the prior Japanese Patent Application No. 2016-222778, filed on Nov. 15, 2016, the entire contents of which are incorporated herein by reference.

FIELD

The embodiment discussed herein is related to apparatus and method to perform secure data sharing in a distributed network by using a blockchain.

BACKGROUND

A distributed file sharing technology for sharing digital file information by performing peer-to-peer communication among client terminals or Internet of Things (IoT) devices has been suggested. Examples of the format of digital files are Hypertext Markup Language (HTML) and Portable Document Format (PDF).

As a specific implementation example of the distributed file sharing technology, Interplanetary File System (IPFS) is known. IPFS is a distributed web technology in which a distributed file sharing system using peer-to-peer communication is extended to world wide web (WWW) services. IPFS is a software technology released by Juan Benet in 2015 and being now used as open-source software. IPFS achieves file access under the distributed environments by using a Hyper Text Transfer Protocol (HTTP) communication system. In IPFS, instead of an HTTP server address, a unique hash value address, such as QmRvPJi7GmNAFbJnVeEEhMCGtJsDEaJYVa4a52J9bqn1AN, is assigned to the content, and addressing is performed in the Uniform Resource Locator (URL) format, such as in http://localhost:8080/ipfs/QmRvPJi7GmNAFbJnVeEEhMCGtJsDEaJYVa4a52J9bqn1AN/, by including a hash value.

IPFS achieves fast search and retrieve for content files. IPFS may solve the problems of content distribution using a server provided in a known cloud system, a waste of network resources, and fault tolerance, and also serves as a serverless content distribution technology for allowing the content to be permanently provided only by distributed clients.

Examples of the above-described related art are Japanese Laid-open Patent Publication Nos. 2011-70557 and 2013-105227.

SUMMARY

According to an aspect of the invention, an apparatus serves as a node device included in a distributed data sharing network, and shares, by using a blockchain, a piece of event information related to an event generated in a terminal, among node devices included in the distributed data sharing network, where the blockchain is a continuously growing list of blocks which are linked and secured using cryptography. The apparatus generates a piece of event data including the piece of event information related to the event, and causes the generated piece of event data to be stored in one of the node devices included in the distributed data sharing network.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A through 4C are diagrams illustrating an example of a blockchain, according to an embodiment;

FIG. 8 is a diagram illustrating an example of a data format of a portal file, according to an embodiment;

DESCRIPTION OF EMBODIMENT

The above-described distributed file sharing system of the related art has no mechanism for authenticating a user performing file issuing or file access. That is, any user is able to access a distributed file sharing network if the user installs a distributed file sharing application.

It is preferable to construct a highly secure file sharing space in a distributed file sharing system.

Figure 1:
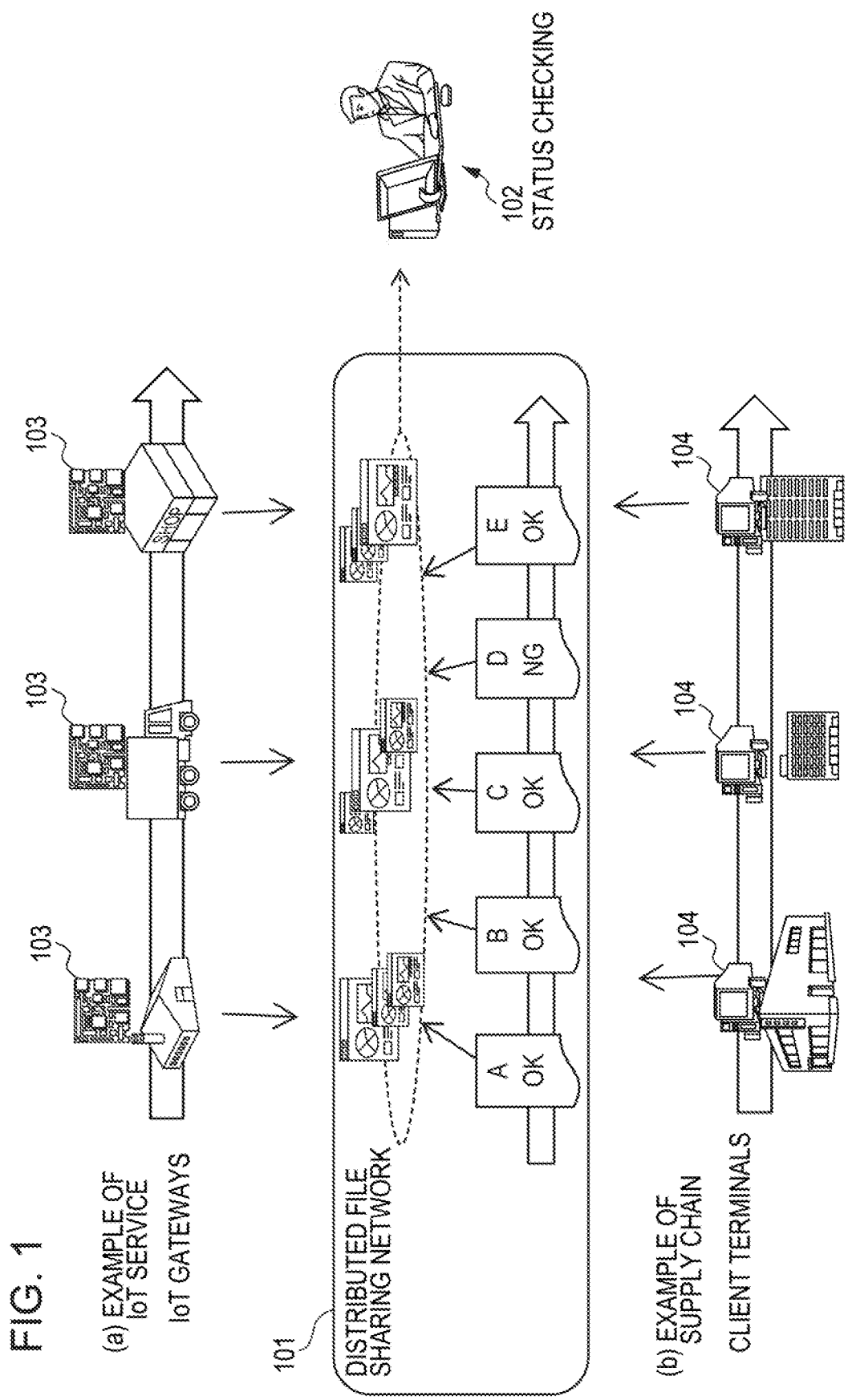
FIG. 1 is a diagram illustrating examples of use cases, according to an embodiment.

An embodiment will be described below in detail with reference to the accompanying drawings. FIG. 1 illustrates examples of use cases to which this embodiment is applicable. In this embodiment, the following services are provided by using a distributed data sharing technology for sharing digital data information, such as HTML, PDF, and text information, by performing peer-to-peer communication among client terminals or IoT devices, which are an example of node devices. As illustrated with (a) in the upper side of FIG. 1, for example, information A through information E collected from IoT devices 103 are autonomously formed into web services and are shared in a distributed file sharing network 101, which is an example of a distributed data sharing network. The distributed file sharing network 101 is constituted by IoT gateways integrated with or separated from the IoT devices 103. As illustrated with (b) in the lower side of FIG. 1, for example, information A through information E related to product manufacturing steps in a supply chain, that is, procurement of raw materials and parts, manufacturing, inventory management, sales, and delivery, are shared in the distributed file sharing network 101 constituted by client terminals 104 in a retail organization. A user is able to perform status checking 102 by using a terminal of the user while referring to information shared in the distributed file sharing network 101.

The distributed file sharing network 101 in this embodiment may be implemented by the above-described IPFS, for example. However, the existing file sharing system such as IPFS has the following problems.

1. No mechanism is provided for authenticating a user performing file issuing or file access. That is, any user is able to access the distributed file sharing network 101 if the user installs a distributed file sharing application.

2. Although the function of performing addressing by using a hash value and the function of searching for a file by specifying an address are provided, the repository function of performing centralized management of the relationship between services and addresses or the function of managing a web access log and a data log is not provided.

3. Anyone is able to register a web file in any place and no function of guaranteeing the uniqueness of the content is provided.

The above-described IPFS is a distributed file sharing system developed for the purpose of allowing any IoT gateways or any client terminals to share files on the Internet, for example. To provide highly secure information sharing services while managing user authentication, file registration, and file access trail (log) on such a distributed file sharing system, the following functions are preferably provided: the function of authenticating a user performing file issuing or file access; the function of guaranteeing the uniqueness of the content, in other words, the uniqueness of a file issuer issuing the content; the function of managing a file registration log and a file access log; and the function of performing centralized management of the relationship between file services and file addresses.

Figure 2:
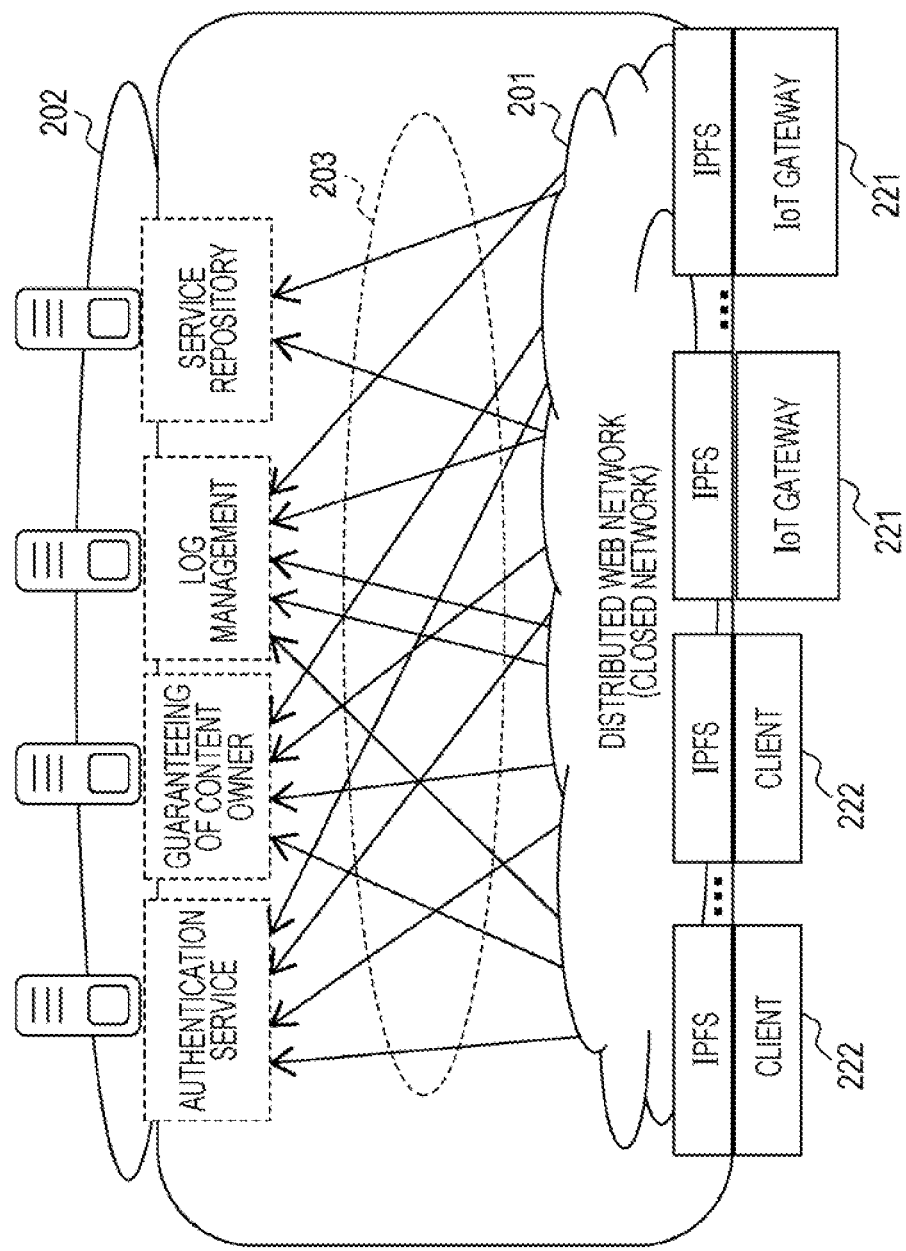
FIG. 2 is a diagram illustrating an example of a configuration in which highly secure information sharing services are provided by using cloud services in a distributed file sharing system such as IPFS, according to an embodiment.

FIG. 2 illustrates an example of the configuration in which highly secure information sharing services are provided by using cloud services in a distributed file sharing system, such as IPFS. In this example, cloud services 202 are provided for a distributed web network 201, such as IPFS, which is a closed network constituted by client terminals 222 and IoT gateways 221, via the Internet or a carrier network 203. The cloud services 202 provide services having the following functions.

1. Authentication function: a service for managing an access log and a data log. For example, a service for conducting authentication as to whether to provide authorization for the use of a network and for recording the use of a network (accounting) is provided by a server in the distributed web network 201, such as a remote authentication dial in user service (RADIUS) server.

2. Service repository function: a service for managing the relationship between services and URLs is provided by a portal server 212, such as a web portal site.

3. Content uniqueness guaranteeing function: when the content is registered, a license code and a content ID (identifier) are issued by a server 213 and are also described in a content file, thereby guaranteeing the uniqueness of this file.

4. Log management function: a service for recording a file registration log and a file access log by a server 214 is provided.

However, if the above-described four functions are provided for a distributed file sharing system, such as IPFS, by the cloud services 202, as illustrated in FIG. 2, the traffic between the distributed web network 201 and the cloud services 202 on the Internet or the carrier network 203 increases. This may impair some advantages of a distributed file sharing system, for example, serverless processing and simultaneous file sharing implemented by edge nodes, such as the client terminals 222 and the IoT gateways 221.

Figure 3A:
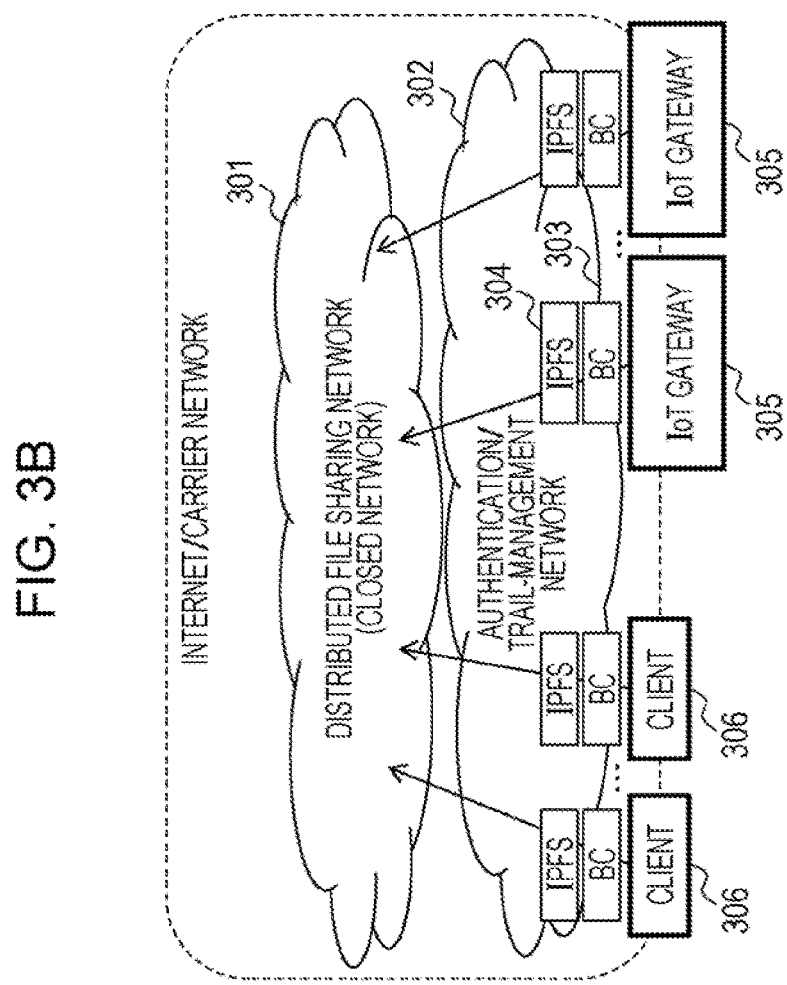
FIGS. 3A and 3B are diagrams illustrating an example of basic concept, according to an embodiment.
Figure 3B:
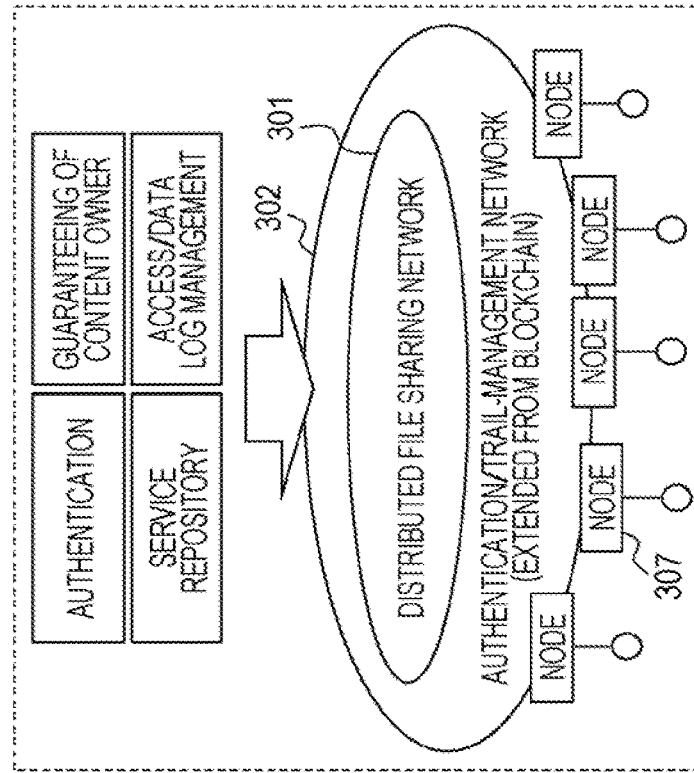

In the following embodiment, while maintaining a distributed file sharing system, a highly secure file sharing system which supports access authentication, guaranteeing of the uniqueness of the content, trail information management related to a file registration log and a file access log is implemented. FIGS. 3A and 3B are diagrams for explaining the basic concept of this embodiment.

In this embodiment, the above-described four functions are implemented under the distributed environments on a distributed file sharing network using peer-to-peer communication, such as IPFS. To achieve this, in this embodiment, a communication method, which is called a blockchain, is employed. Information related to an event generated in a terminal is shared among node devices included in the distributed file sharing network by using a blockchain. Then, a file describing the information related to the event is generated and is stored in one of the node devices included in the distributed file sharing network. This technology may be applied and extended to achieve the following functions under the distributed environments: authenticating transactions, guaranteeing the validity of the transactions, and managing a transaction log so that it will not be tampered with. The basic concept of this embodiment is illustrated in FIG. 3A. To communicate with a distributed file sharing network 301, a node 307 first accesses a distributed authentication/trail-management network 302 implemented by the extension of a blockchain. Then, the node 307 accesses the distributed file sharing network 301. The distributed file sharing network 301 is provided such that it is included in the distributed authentication/trail-management network 302.

FIG. 3B illustrates a more specific configuration of this embodiment. A blockchain application 303 (indicated by "BC" in FIG. 3B) is installed in each of IoT gateways 305 and client terminals 306. The blockchain application 303 is software for processing transactions handled in the blockchain. The distributed authentication/trail-management network 302 is formed by the blockchain application 303 operating in an IoT gateway 305 or a client terminal 306. An IPFS application 304 (indicated by "IPFS" in FIG. 3B) is installed in each of the IoT gateways 305 and the client terminals 306. The IPFS application 304 is software for providing the function of registering (storing) a file or accessing a file in the distributed file sharing network 301. The distributed file sharing network 301 is formed by the IPFS application 304 operating in an IoT gateway 305 or a client terminal 306. Hereinafter, a client terminal refers to a terminal operated by a client or a client.

In this embodiment, when an event, such as a sensor detection event, has generated in an IoT gateway 305 or has been received by the IoT gateway 305, a request to register a file related to this event (event information file) is made. In response to this request, the IoT gateway 305 executes the blockchain application 303. The blockchain application 303 executes the IPFS application 304 to cause it to register the event information file in the distributed file sharing network 301. At this time, the blockchain application 303 operating in the IoT gateway 305 executes the following functions: authenticating the user of the IoT gateway 305, guaranteeing the uniqueness of the content, service repository management, and data log management (trail management). This achieves highly secure registration of the event information file in the distributed file sharing network 301.

In this embodiment, in response to a request to read a file from a client terminal 306, the client terminal 306 executes the blockchain application 303. The blockchain application 303 executes the IPFS application 304 to cause it to execute processing for sending a request to read a file to the distributed file sharing network 301. At this time, the blockchain application 303 operating in the client terminal 306 executes the following functions: authenticating a user of the client terminal 306 or the group to which the user belongs, controlling file access, and managing an access log (trail management). This achieves the highly secure reading of a file on the distributed file sharing network 301.

As described above with reference to FIG. 3B, in this embodiment, the blockchain application 303 operates as a proxy for accessing the distributed file sharing network 301 via the IPFS application 304. It is thus possible to construct a highly secure closed network space in a distributed file sharing system.

The blockchain refers to a technology for sharing information (ledger) among users. The blockchain is a distributed ledger system in which a ledger describing various items of transaction information is opened to public and all or some multiple users check the validity of the ledger so as to carry out transactions without any illegality.

FIGS. 4A through 4C are diagrams for explaining a blockchain. In a blockchain, user authentication is conducted by using a digital certificate technology. When a user first registers an account in a blockchain, as illustrated in FIG. 4A, a private key and a public key associated with each other are first generated, and a user ID is then generated. The private key, the public key, and the user ID are then issued to the user. A digital certificate is then issued to the user based on the private key and the public key. The blockchain has the function of authenticating a user by checking whether the user has this digital certificate. That is, the user having this digital certificate is authorized to use the blockchain. This embodiment utilizes this authentication function.

The user issues a transaction by using three items of information, that is, the private key, the public key, and the user ID. It is now assumed that the user issuing a transaction is a user B and a transaction Tx2 is issued from the user B to a user C. The blockchain has the function of issuing a new transaction (transaction Tx2) by using a transaction Tx1 which has already been sent to a sender as input. That is, the blockchain issues a new transaction based on an approved transaction, thereby enhancing the reliability of transactions.

As illustrated in FIG. 4B, the public key of the user C, which is the destination of the transaction Tx2, is specified as information related to the destination of the transaction Tx2. The hash value is calculated for the unsigned transaction Tx2 including the hash value of the approved transaction Tx1, and a digital signature is calculated for the hash value calculated for the transaction Tx2 by using the private key of the user B, and the calculated digital signature is appended to the transaction Tx2 as issuer information.

When the transaction Tx2 is broadcast to a blockchain network, another user belonging to the blockchain network verifies the signature of the transaction Tx2 in the following manner. As illustrated in FIG. 4B, the hash value is calculated from the unsigned portion of the transaction Tx2. The hash value used for generating the digital signature of the user B appended to the transaction Tx2 as issuer information is calculated by using the public key of the user B. If these two hash values coincide with each other, the user confirms that the transaction Tx2 has been issued by the authorized user B.

In this manner, the blockchain has a mechanism in which, while an approved transaction is being verified by using a digital signature, a new transaction is issued based on a hash value of the approved transaction as input so as to enhance the reliability of transactions. Each of blocks forming the blockchain is constituted by a transaction in which information related to the one previous block and a list of all transactions carried out within a certain period of time (integrated individual transactions) are recorded. That is, the transaction of each block records all transactions carried out within a certain period of time.

For example, in a blockchain in which a specific checking node called a miner is provided, the miner executes processing for confirming a block including a new transaction issued by a certain node within a blockchain network. Highly secure ledger management is implemented by this confirmation processing. Information related to a log of all transactions issued by nodes within the blockchain network is shared and managed in a distributed ledger.

FIG. 4C is a diagram illustrating an example of this confirmation processing that is performed in the blockchain in which a specific checking node called a miner is provided. In this example, the miner calculates a hash value for an unapproved block constituted by three items of information, that is, the hash value of the one previous block, the hash value of the root in a Merkle tree formed from a transaction list, and a nonce value randomly generated by the miner. The miner tries to find a nonce value that makes a hash value satisfy a specific condition (a value having at least a certain number of consecutive 0s at the head, for example) while randomly changing the nonce value. After finding such a nonce value, the miner confirms (approves) the unapproved block as a tamper-proof block by using the above-described three items of information including the nonce value. The miner receives a reward for this confirmation processing. The miner then broadcasts the confirmed block to all users within the blockchain network. Because of the mechanism of confirmation of blocks, if the hash value of a certain block does not satisfy a specific condition (a value having at least a certain number of consecutive 0s at the head, for example), such a block is not regarded as a confirmed (approved) block within the blockchain network. The unapproved block is not used as input into the subsequent block.

A user receiving the nonce value of a block first verifies whether the digital signature of each transaction included in the block is valid. The user also verifies whether the hash value calculated from this block satisfies the above-described specific condition (a value having at least a certain number of consecutive 0s at the head, for example). If the validity of the digital signature and that of the hash value are verified, the user adds the approved block to the end of the blockchain of the user according to the procedure illustrated in FIG. 4B.

If someone tries to tamper with information within this block, inconsistencies are bound to occur in the three items of information in the block and the entire blockchain. As a result, a tamper-proof database is constructed. By providing the "unique blockchain" in the entire network, all users within the network are able to share the consistent transaction log.

In this embodiment, the blockchain application 303 illustrated in FIG. 3B operating in the blockchain network having the above-described mechanism serves as a proxy for accessing the distributed file sharing network 301 via the IPFS application 304. In this manner, information related to an event generated in a terminal is shared among node devices included in a distributed file sharing network by using a blockchain.

Figure 5:
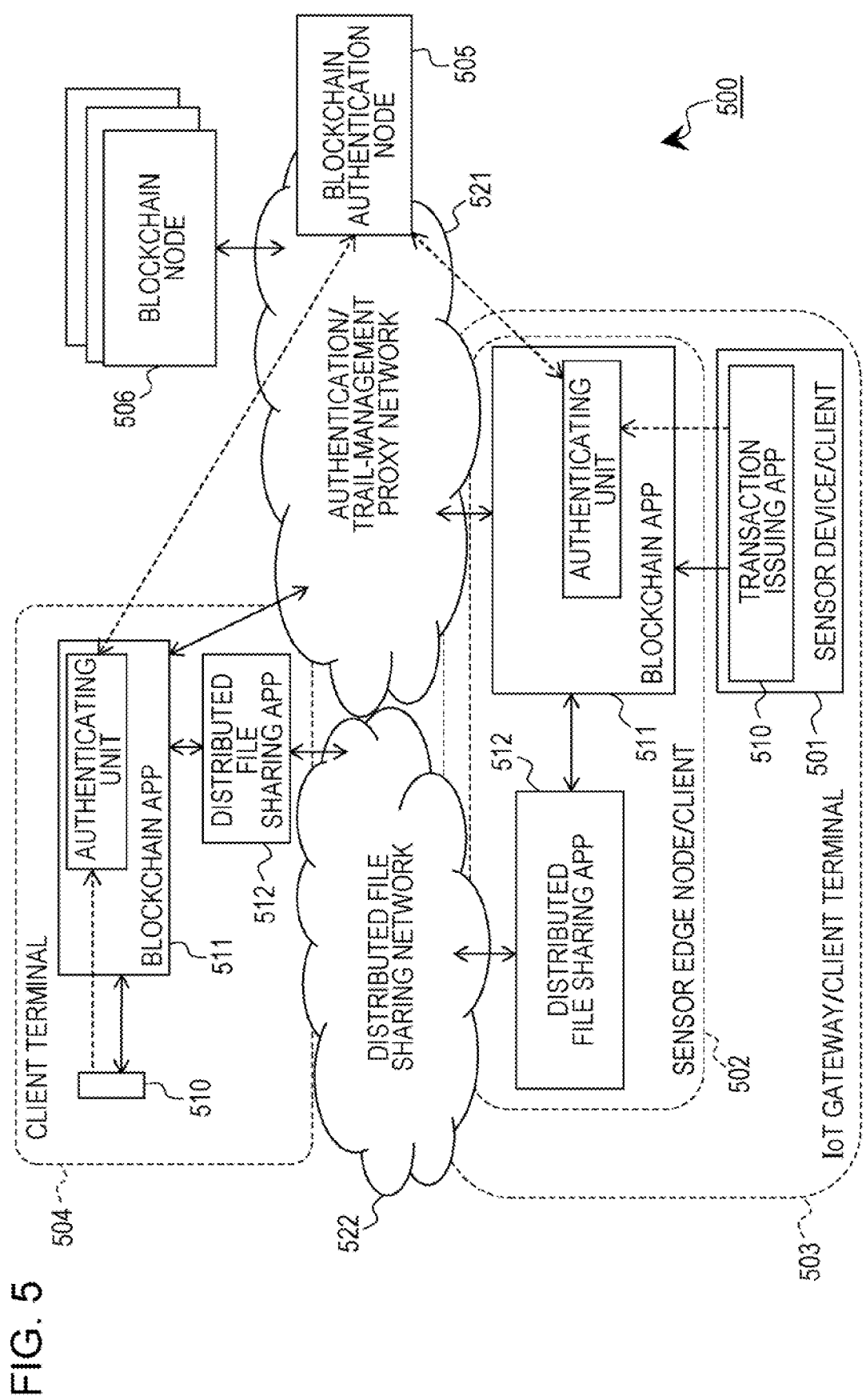
FIG. 5 is a diagram illustrating an example of a configuration of a communication system, according to an embodiment.

FIG. 5 illustrates an example of the configuration of a communication system 500 according to this embodiment. The communication system 500 includes a sensor device or a client terminal (hereinafter called the "sensor device/client terminal") 501 having a transaction issuing application (hereinafter called the "transaction issuing app") 510. The communication system 500 also includes a sensor edge node or a client terminal (hereinafter called the "sensor edge node/client terminal") 502 having a blockchain application (hereinafter called the "blockchain app") 511 and a distributed file sharing application (hereinafter called "distributed file sharing app") 512. A combination of the sensor device 501 and the sensor edge node 502 is used in a use case in the example of the IoT service sensor network illustrated in the upper side of FIG. 1. A combination of the client terminal 501 and the client terminal 502 is used in a use case in the example of the supply chain illustrated in the lower side of FIG. 1. The sensor device/client terminal 501 and the sensor edge node/client terminal 502 may be an IoT gateway or a client terminal (hereinafter called the "IoT gateway/client terminal") 503, which is an integrated node terminal. That is, the IoT gateway/client terminal 503 has the transaction issuing app 510, the blockchain app 511, and the distributed file sharing app 512. These apps may be installed in a node device other than a node device constituted by an IoT gateway or a client terminal. In the following description, the sensor device/client terminal 501 and the sensor edge node/client terminal 502 are collectively called the IoT gateway/client terminal 503.

The communication system 500 also includes a client terminal 504 having a transaction issuing app 510, a blockchain app 511, and a distributed file sharing app 512. The client terminal 504 may be configured to include only the transaction issuing app 510, while the blockchain app 511 and the distributed file sharing app 512 may be installed in another node device.

The communication system 500 also includes a blockchain authentication node 505 and blockchain nodes 506. The authenticating unit of the blockchain authentication node 505 allows a user or a group to log in an authentication/trail-management proxy network 521 and also issues a service approved transaction, which is the initial transaction of the blockchain.

The blockchain app 511 includes an authenticating unit which communicates with the blockchain authentication node 505 to authenticate a user or a group operating the IoT gateway/client terminal 503 or the client terminal 504.

The IoT gateway/client terminal 503 corresponds to the IoT gateway 103 or the client terminal 104 illustrated in FIG. 1, or the IoT gateway 305 illustrated in FIG. 3B. That is, the IoT gateway/client terminal 503 outputs sensor information, or product manufacturing step information related to the procurement of raw materials and parts, manufacturing, inventory management, sales, and delivery, input by a terminal operator.

The IoT gateway/client terminal 503, the client terminal 504, the blockchain authentication node 505, and the blockchain nodes 506 form the authentication/trail-management proxy network 521. The authentication/trail-management proxy network 521 is included in a blockchain network. The IoT gateway/client terminal 503 and the client terminal 504 form a distributed file sharing network 522.

Figure 6:
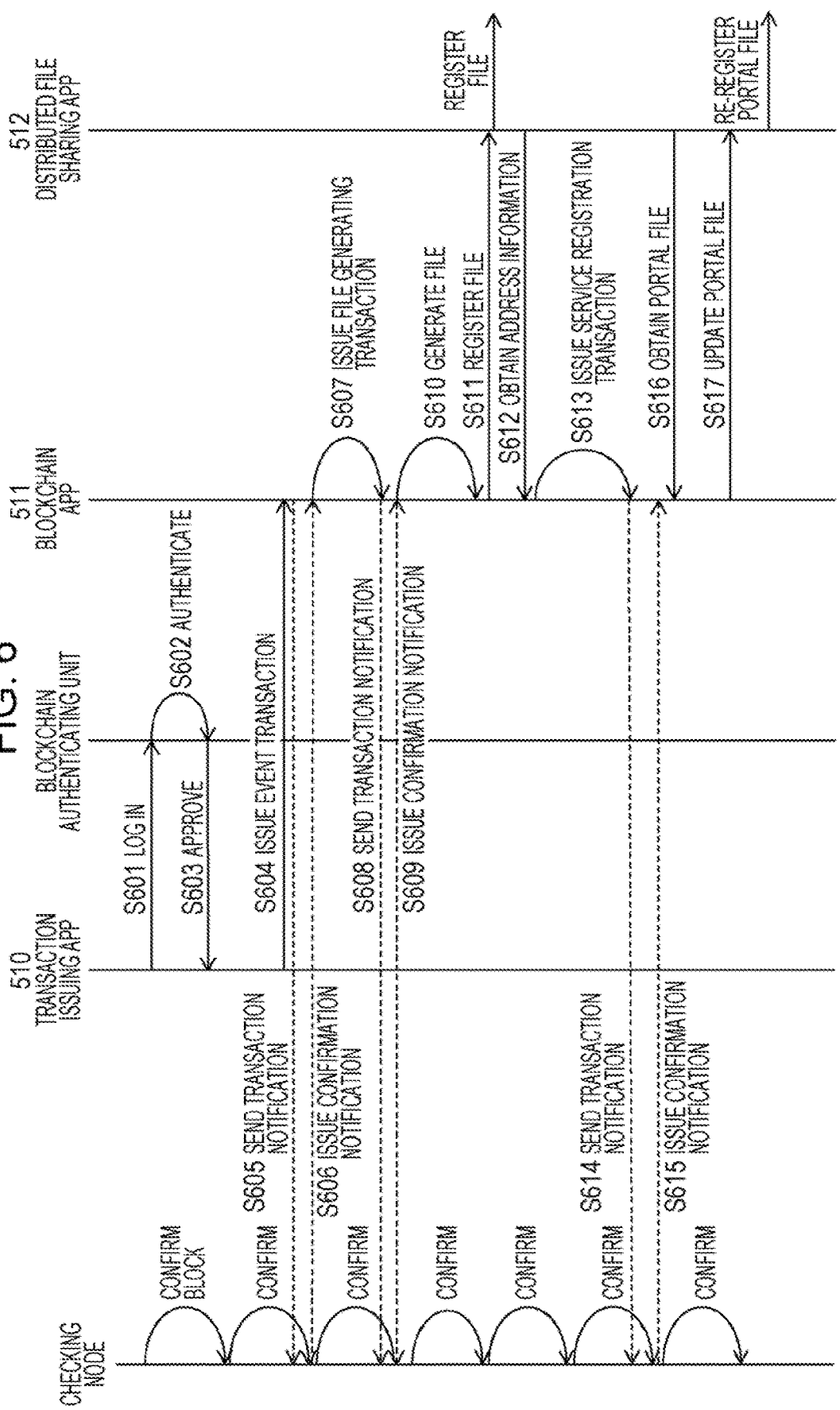
FIG. 6 is a diagram illustrating an example of an operational sequence for file issuing processing, according to an embodiment.
Figure 7:
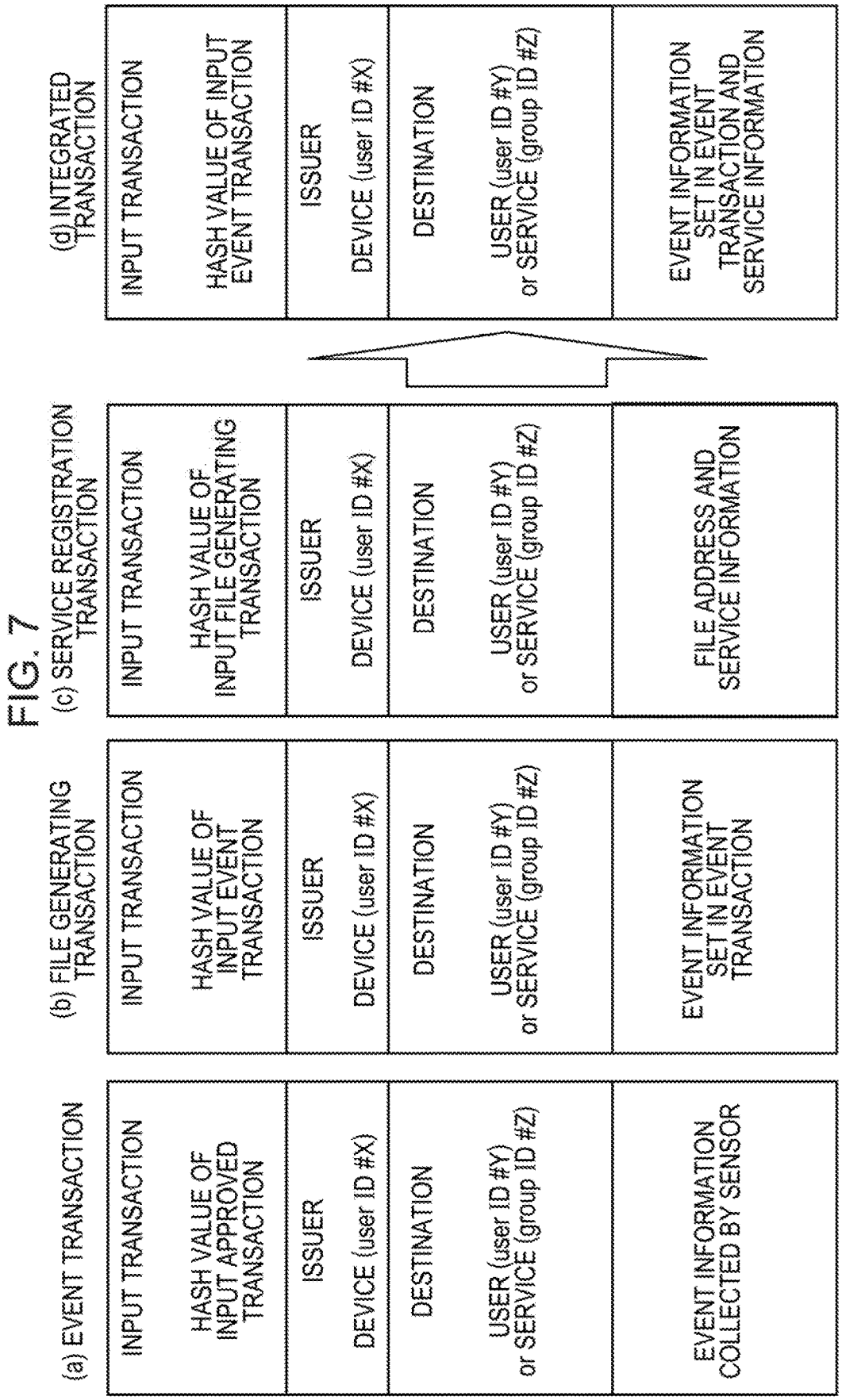
FIG. 7 is a diagram illustrating examples of data formats of transactions used in file issuing processing, according to an embodiment.

Details of the operation of the communication system 500 configured as illustrated in FIG. 5 in this embodiment will be described below. FIG. 6 is a sequence diagram illustrating an example of file issuing processing executed in the communication system 500 illustrated in FIG. 5. FIG. 7 illustrates examples of data formats of transactions used in the example of file issuing processing illustrated in FIG. 6.

An example of file issuing processing will first be briefly discussed below.

(Step 1: Execution of User Authentication)

First, user authentication for the sensor device/client terminal 501 within the IoT gateway/client terminal 503 is conducted by using a digital certificate used in known blockchain software.

(Step 2: Execution of Trail Management of File Registration)

When the sensor device/client terminal 501 detects an event, the transaction issuing app 510 illustrated in FIG. 5 executes the following processing. The transaction issuing app 510 issues an event transaction (transaction related to an event) addressed from the sensor device/client terminal 501 (user ID #X) to a specific user (user ID #Y) or a sharing service (group ID #Z). This event transaction includes event information and the hash value of a service approved transaction as input.

(Step 3: Generation and Registration of Event Information File and Guaranteeing of Uniqueness of the Content)

After a checking node has confirmed a block including an event transaction, the blockchain app 511 issues a new file generating transaction for generating a file including event information contained in the event transaction. In response to issuing of the file generating transaction, the blockchain app 511 embeds information related to the hash value of the event transaction as the ID for guaranteeing the uniqueness of the content, and automatically generates an event information file including the above-described event information. The blockchain app 511 registers the event information file in the distributed file sharing network 522, such as IPFS, via the distributed file sharing app 512. At this time, timestamp information indicating the time at which the event transaction has been issued may be appended to the event information file.

(Step 4: Provision of Repository Function by Updating of Portal File)

The blockchain app 511 obtains via the distributed file sharing app 512 file address information (the address of the hash value in the case of IPFS) issued when the event information file is registered in the distributed file sharing network 522. Based on the hash value of the file generating transaction as input, the blockchain app 511 issues a service registration transaction addressed from the sensor device/client terminal 501 (user ID #X) to the specific user (user ID #Y) or the sharing service (group ID #Z). In the service registration transaction, a file address indicated by the file address information is described. The service registration transaction includes the hash value of the file generating transaction, address information related to the event information file, and service information. In response to issuing of the service registration transaction, the blockchain app 511 updates a portal file indicating a portal site opened in the distributed file sharing network 522 by adding information that associates the content, such as a service name, with the file address, to the portal file. The updated portal file is re-registered in the distributed file sharing network 522.

According to the above-described procedure, it is possible to manage authentication and trail information related to the registration of a file in the distributed file sharing network 522, and also to manage the guaranteeing of the uniqueness of the content, by using a blockchain. It is also possible to provide the repository function of performing centralized management of the relationship between the file addresses and the service contents, such as service information, as a portal file used on the distributed file sharing network 522.

Details of the example of file issuing processing illustrated in FIG. 6 will be discussed below.

Upon generating of an event, such as output from a sensor within the IoT gateway/client terminal 503 or input into the IoT gateway/client terminal 503, the IoT gateway/client terminal 503 starts the transaction issuing app 510 installed in the IoT gateway/client terminal 503. Then, the transaction issuing app 510 accesses the known authenticating unit within the blockchain app 511 executed in the IoT gateway/client terminal 503 by using a user account assigned to the IoT gateway/client terminal 503 in advance, and logs in the authenticating unit (S601).

The authenticating unit of the blockchain app 511 within the IoT gateway/client terminal 503 authenticates the above-described login access while communicating with the blockchain authentication node 505 within the authentication/trail-management proxy network 521 (S602).

If authentication is successfully conducted, the authenticating unit of the blockchain app 511 informs the transaction issuing app 510 of the hash value of a predetermined service approved transaction, and permits the user to log in the distributed authentication/trail-management network (blockchain) 302 (S603).

Then, the transaction issuing app 510 within the IoT gateway/client terminal 503 issues an event transaction including event information (sensor output information or manufacturing step information) related to the event generated in the IoT gateway/client terminal 503 and the hash value of the service approved transaction (S604). At this time, the transaction issuing app 510 sets the user ID of the IoT gateway/client terminal 503 and information related to the associated public key in the event transaction as issuer information. The transaction issuing app 510 also sets a predetermined user ID or group ID assigned to a service of file registration processing and information related to the associated public key, in the event transaction as destination information.

A notification including this event transaction is sent to all the blockchain nodes 506 forming the authentication/trail-management proxy network 521, which is a blockchain (S605). One or more of the blockchain nodes 506 are operated as checking nodes (miners) discussed with reference to FIG. 4C. The checking node executes processing for confirming the block including the event transaction by verifying the digital certificate described in the received transaction. One of the checking nodes executes this confirmation processing and issues a confirmation notification (S606).

Upon receiving a notification of issuing an event transaction (S604) and a confirmation notification for the block corresponding to the event transaction (S606), the blockchain app 511 operating within the IoT gateway/client terminal 503 executes the following processing. The blockchain app 511 issues a file generating transaction (S607). The file generating transaction includes the hash value of the event transaction corresponding to the confirmed block and the event information contained in the event transaction, and is used for executing file generating processing. The blockchain app 511 sets, in the file generating transaction, the user ID of the sensor device/client terminal 501 (see FIG. 5) set in the event transaction, where the user ID is information related to the issuer. As destination information, the blockchain app 511 sets, in the file generating transaction, the predetermined user ID or group ID set in the event transaction, which is assigned to a service of the file registration processing.

A notification including this file generating transaction is sent to all the blockchain nodes 506 forming the authentication/trail-management proxy network 521, which is a blockchain (S608). Among the blockchain nodes 506, one of the checking nodes executes confirmation processing for the block including the received file generating transaction, and issues a confirmation notification (S609).

Upon receiving the notification including the file generating transaction (S607) and the confirmation notification for the block corresponding to the file generating transaction (S609), the blockchain app 511 operating within the IoT gateway/client terminal 503 executes the following processing.

The blockchain app 511 executes file generating processing for generating an event information file including the event information contained in the received event transaction (S610). At the same time, the blockchain app 511 embeds, in the event information file, the hash value of the event transaction which is set in the file generating transaction corresponding to the confirmed block, as the ID for guaranteeing the uniqueness of the content. Timestamp information indicating the time at which the event transaction has been issued may be appended to the event information file. To enhance the confidentiality of the event information file, the blockchain app 511 may encrypt the event information file to be registered in the distributed file sharing system by using the public key corresponding to the user ID or the group ID of the destination, which is set in the file generating transaction. In this case, only a user or a group having the private key associated with the public key of the user ID or the group ID is able to read information related to the event information file registered in the distributed file sharing system. Then, the blockchain app 511 starts the distributed file sharing app 512 within the IoT gateway/client terminal 503 (S610).

The distributed file sharing app 512 executes file registration processing for the generated event information file (S611 and S612). The distributed file sharing app 512 first registers the event information file in the distributed file sharing network 522 (S611). The distributed file sharing app 512 then obtains, as address information, the hash value of the registered event information file from a node in which the event information file has been registered, and informs the blockchain app 511 within the IoT gateway/client terminal 503 of the obtained address information (S612).

Upon receiving the address information corresponding to the event information file, the blockchain app 511 issues a service registration transaction including the hash value of the file generating transaction as input (S613). At this time, in the service registration transaction, the blockchain app 511 sets the hash value (address information) of the event information file obtained in S612 and information related to the service of the event corresponding to this event information file. As issuer information, the blockchain app 511 sets, in the service registration transaction, the user ID of the sensor device/client terminal 501 (see FIG. 5) which is set in the file generating transaction. As destination information, the blockchain app 511 sets, in the service registration transaction, the user ID or the group ID assigned to the service of the file registration processing, which is set in the file generating transaction.

A notification including this service registration transaction is sent to all the blockchain nodes 506 forming the authentication/trail-management proxy network 521, which is a blockchain (S614). Among the blockchain nodes 506, one of the checking nodes executes confirmation processing for the block including the received service registration transaction, and issues a confirmation notification (S615).

Upon receiving a notification of issuing the service registration transaction (S613) and a confirmation notification for the block corresponding to the service registration transaction (S615), the blockchain app 511 operating within the IoT gateway/client terminal 503 executes the following service registration processing. The blockchain app 511 first accesses the distributed file sharing app 512 within the IoT gateway/client terminal 503 to obtain a portal file from the distributed file sharing network 522 (S616). The blockchain app 511 then adds, to the portal file obtained in S616, information that includes the hash value (address information) of the event information file obtained in S612 in association with information including the service content corresponding to the event information file. The blockchain app 511 updates the portal file in this manner (S617). The blockchain app 511 then accesses the distributed file sharing app 512 within the IoT gateway/client terminal 503 and causes it to re-register the updated portal file in the distributed file sharing network 522 (S617).

In the above-described portal file updating processing, to avoid simultaneous updating of the portal file by another IoT gateway/client terminal 503, the distributed file sharing app 512 may execute mutual exclusion control. The distributed file sharing app 512 executes control so that, while prohibiting simultaneous updating of the portal file, an updating authorization will be provided to only one user and the other users will be locked. Alternatively, an application programming interface (API) for informing the portal file administrator of the relationship between the service contents and file addresses may be provided, and the distributed file sharing app 512 within the IoT gateway/client terminal 503 may delegate the updating of the portal file to the portal file administrator.

According to the above-described control processing, it is possible to manage authentication and trail information related to the registration of a file in the distributed file sharing network 522, and also to manage guaranteeing of the uniqueness of the content, by using the authentication/trail-management proxy network 521, which is a blockchain.

The service contents and file addresses are associated with each other in a portal file, thereby allowing a blockchain to perform centralized management of the portal file in a distributed file sharing system. FIG. 8 illustrates an example of the data format of a portal file obtained in S616 and registered in S617. In the portal file, the service content and the file name of an event information file are associated with the hash value (address information) of the event information file.

Details of examples of data formats of the transactions used in file issuing processing in FIG. 6 will be discussed below with reference to FIG. 7.

The event transaction issued by the transaction issuing app 510 of the IoT gateway/client terminal 503 in S604 in FIG. 6 has a data format, such as that illustrated with (a) in FIG. 7. As illustrated with (a) in FIG. 7, in the event transaction, the hash value of the service approved transaction supplied to the transaction issuing app 510 in S603 is set as the input transaction used in a blockchain. In the event transaction, event information related to a sensor event generated in the IoT gateway/client terminal 503 is also set. In the event transaction, the user ID (indicated by "user ID #X" in FIG. 7A) of the sensor device/client terminal 501 (see FIG. 5) and information related to the associated public key are set as issuer information. In the event transaction, the user ID (indicated by "user ID #Y" in FIG. 7A) or the group ID (indicated by "group ID #Z" in FIG. 7A) assigned to a service of file registration processing, and information on the public key associated therewith, are also set as destination information.

The file generating transaction issued by the blockchain app 511 of the IoT gateway/client terminal 503 in S607 in FIG. 6 has a data format, such as that illustrated with (b) in FIG. 7B. As illustrated with (b) in FIG. 7B, in the file generating transaction, the hash value of the event transaction corresponding to the block confirmed by the confirmation notification issued in S606 is set as the input transaction used in the blockchain. In the file generating transaction, the event information set in the event transaction is also set. In the file generating transaction, the user ID (indicated by "user ID #X" in FIG. 7B) of the sensor device/client terminal 501 (see FIG. 5) set in the event transaction and information on the public key corresponding thereto are also set as issuer information. In the file generating transaction, the user ID (indicated by "user ID #Y" in FIG. 7B) or the group ID (indicated by "group ID #Z" in FIG. 7B) assigned to a service of file registration processing and information on the public key corresponding thereto are also set as destination information.

The service registration transaction issued by the blockchain app 511 of the IoT gateway/client terminal 503 in S613 in FIG. 6 has a data format, such as that illustrated with (c) in FIG. 7. As illustrated with (c) in FIG. 7C, in the service registration transaction, the hash value of the file generating transaction corresponding to the block confirmed by the confirmation notification issued in S609 is set as the input transaction used in the blockchain. In the service registration transaction, the hash value (address information) of the event information file obtained in S612 and information related to the service of the event corresponding to the event information file are also set. In the service registration transaction, the user ID (indicated by "user ID #X" in FIG. 7C) of the sensor device/client terminal 501 (see FIG. 5) set in the file generating transaction is set as issuer information. In the service registration transaction, the user ID (indicated by "user ID #Y" in FIG. 7C) or the group ID (indicated by "group ID #Z" in FIG. 7C) assigned to a service of file registration processing is also set as destination information.

The data format of an integrated transaction illustrated with (d) in FIG. 7 will be discussed later.

Figure 9:
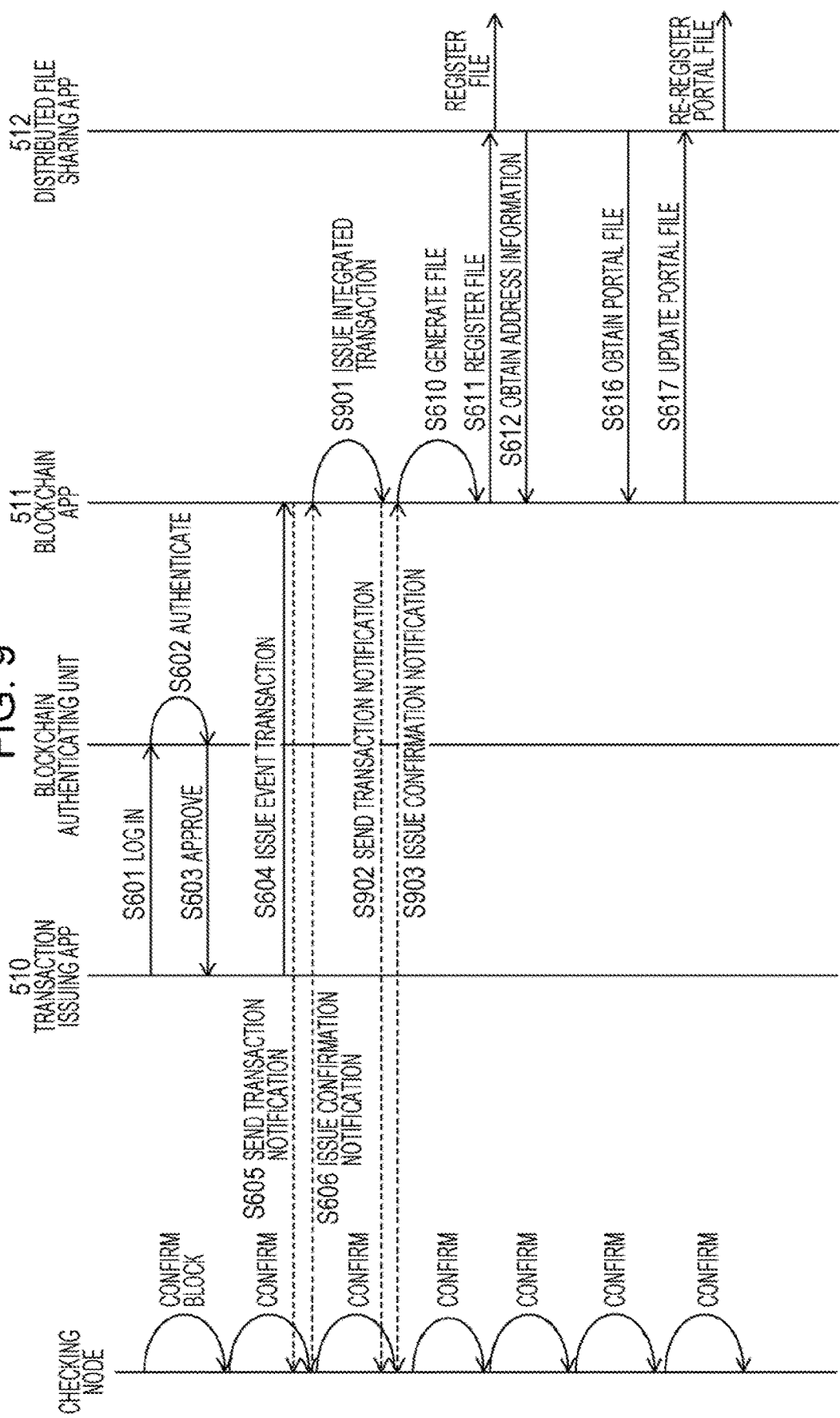
FIG. 9 is a diagram illustrating an example of an operational sequence for file issuing processing, according to an embodiment.

FIG. 9 is a sequence diagram illustrating another example of file issuing processing in the communication system 500 illustrated in FIG. 5. In the example of file issuing processing in FIG. 6, the file generating transaction for executing file generating processing (S610) and file registration processing (S611 and S612), and the service registration transaction for executing service registration processing (S616 and S617) are separately used. In contrast, in the example of file issuing processing in FIG. 9, file generating processing (S610), file registration processing (S611 and S612), and service registration processing (S616 and S617) are sequentially executed in response to the confirmation of a block including one transaction.

In FIG. 9, steps designated by the same step numbers as those in FIG. 6 are the same processing as those in FIG. 6. Steps different from those in FIG. 6 will be discussed below.

Upon receiving an event transaction issuing notification (S604) and a confirmation notification for the block corresponding thereto (S606) as in FIG. 6, the blockchain app 511 operating within the IoT gateway/client terminal 503 executes the following processing. The blockchain app 511 issues an integrated transaction indicated by the example of the data format illustrated with (d) in FIG. 7 (S901). In the integrated transaction, the hash value of the event transaction corresponding to the block confirmed by the confirmation notification issued in S606 is set. The event information included in the event transaction is also set in the integrated transaction. Service information associated with the event information is also set in the integrated transaction. In the integrated transaction, the user ID (indicated by "user ID #X" in FIG. 7D) set in the event transaction is set as issuer information. In the integrated transaction, the user ID (indicated by "user ID #Y" in FIG. 7D) or the group ID (indicated by "group ID #Z" in FIG. 7D) set in the event transaction is also set as destination information.

A notification including this integrated transaction is sent to all the blockchain nodes 506 forming the authentication/trail-management proxy network 521, which is a blockchain (S902). Among the blockchain nodes 506, one of the checking nodes executes confirmation processing for the block including the integrated transaction and issues a confirmation notification (S903).

Upon receiving an integrated transaction issuing notification (S901) and a confirmation notification for the block corresponding thereto (S903), the blockchain app 511 operating within the IoT gateway/client terminal 503 executes the following processing. The blockchain app 511 sequentially executes file generating processing (S610), file registration processing (S611 and S612), and service registration processing (S616 and S617) discussed with reference to FIG. 6.

Figure 10:
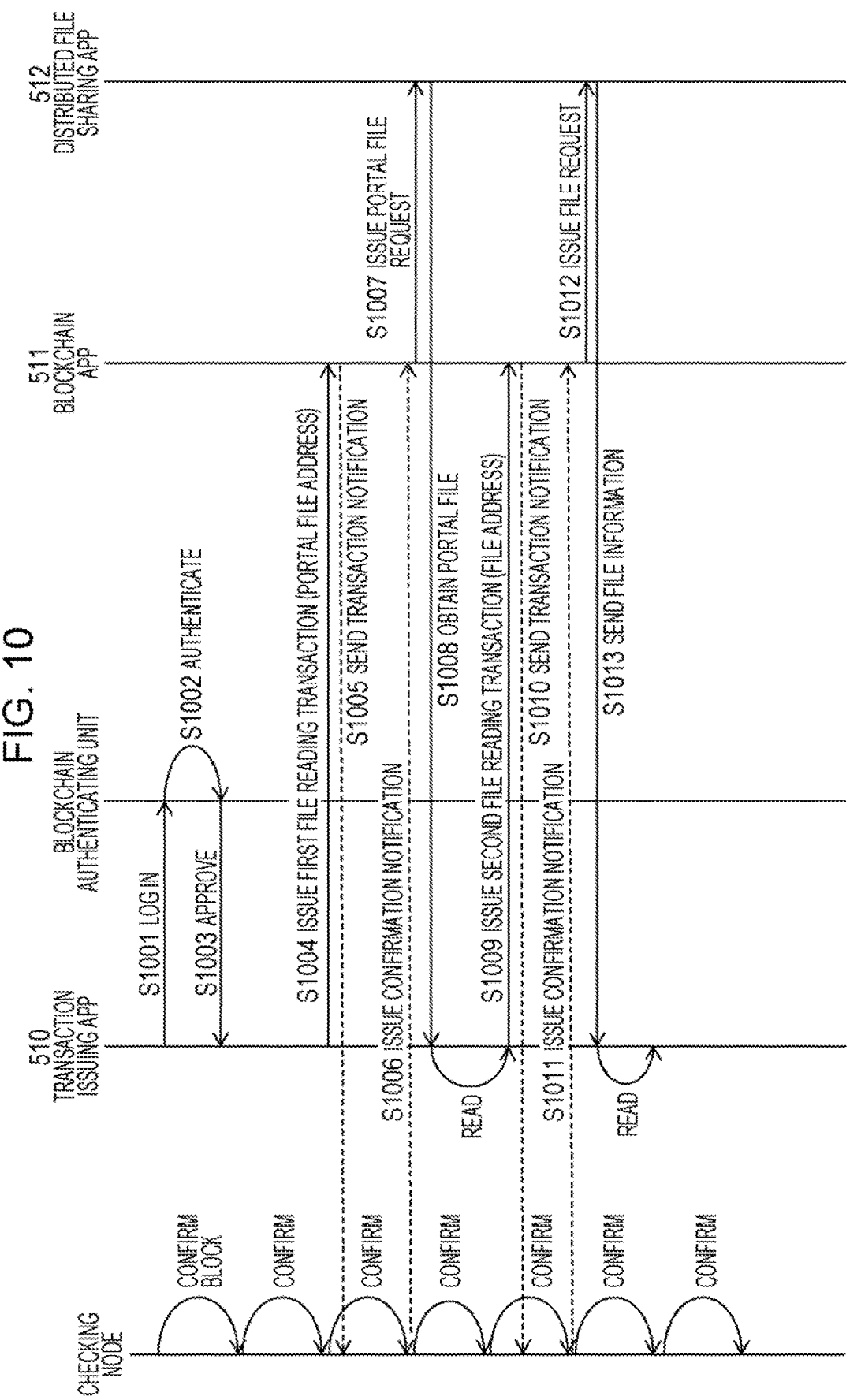
FIG. 10 is a diagram illustrating an example of an operational sequence for file access processing, according to an embodiment.
Figure 11:
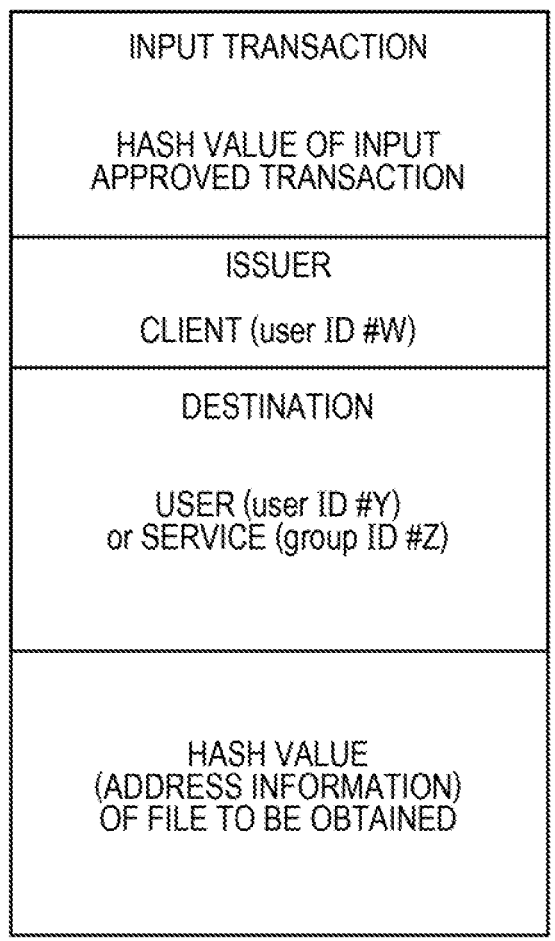
FIG. 11 is a diagram illustrating an example of a data format of a transaction used in file access processing, according to an embodiment.

FIG. 10 is a sequence diagram illustrating an example of file access processing in the communication system 500 illustrated in FIG. 5. FIG. 11 illustrates an example of the data format of a transaction used in the example of file access processing illustrated in FIG. 10.

An example of file access processing will first be briefly discussed below.

(Step 1: Execution of User Authentication)

First, authentication for a user making file access from the client terminal 504 is conducted by using a digital certificate issued in a known blockchain.

(Step 2: Execution of Trail Management of File Access)

To allow a user to access a file, the transaction issuing app 510 within the client terminal 504 issues a file reading transaction including the address of a portal file of a portal site by using the hash value of a service approved transaction as input. The issuer of this file reading transaction is an ID of a user (user ID #W) of the client terminal 504 and information on the public key corresponding thereto, and the destination is an ID of a specific user (user ID #Y) or an ID for a sharing service (group ID #Z) and information on the public key corresponding thereto. The transaction issuing app 510 obtains information of portal file services for managing a sharing space from the distributed file sharing network 522 via the blockchain app 511 and the distributed file sharing app 512 within the client terminal 504. This enables the user to read information of the portal site.

(Step 3: Execution of File Access and Trail Management of File Access)

In the client terminal 504, the user selects a file described in the portal site. Then, the transaction issuing app 510 within the client terminal 504 issues a file reading transaction including the address of the file selected by the user by using the hash value of the service approved transaction as input. The issuer of this file reading transaction is the user (user ID #W) of the client terminal 504 and information on the public key corresponding thereto, and the destination is the specific user (user ID #Y) or the sharing service (group ID #Z) and information on the public key corresponding thereto. The transaction issuing app 510 obtains the file selected by the user from the distributed file sharing network 522 via the blockchain app 511 and the distributed file sharing app 512 within the client terminal 504. Then, the user is able to read the file.

According to the above-described processing, it is possible to implement authentication and trail information management related to file access on the distributed file sharing network 522 by utilizing the function of a blockchain. The trail information may be used for service billing. The transaction issuing app 510 may wait to issue a file reading transaction until the user obtains a requested file. The transaction issuing app 510 may issue a file reading transaction after checking that the user has obtained the file. Each transaction is not executed until a corresponding block is confirmed by the blockchain. The node which confirms a block may be a node within the client terminal 504 or another node.

Details of the example of file access processing illustrated in FIG. 10 will be discussed below.

Upon generating of an event of a file reading request, the client terminal 504 starts the transaction issuing app 510 installed in the client terminal 504. Then, the transaction issuing app 510 accesses the known authenticating unit within the blockchain app 511 of the client terminal 504 by using a user account assigned to the client terminal 504 in advance, and logs in the authenticating unit (S1001).

The authenticating unit of the blockchain app 511 within the client terminal 504 authenticates the above-described login access while communicating with the blockchain authentication node 505 within the authentication/trail-management proxy network 521 (S1002).

When authentication is successfully conducted, the authenticating unit of the blockchain app 511 informs the transaction issuing app 510 of the hash value of a predetermined service approved transaction, and approves login access (S1003).

Then, the transaction issuing app 510 within the client terminal 504 issues a first file reading transaction including the hash value (address information) of a portal file specified by the file reading request generated in the client terminal 504 and the hash value of the service approved transaction (S1004). At this time, the transaction issuing app 510 sets the user ID of the client terminal 504 in the first file reading transaction as issuer information. As destination information, the transaction issuing app 510 sets a predetermined user ID or group ID assigned to a service of file registration processing, in the first file reading transaction.

A notification including this first file reading transaction is sent to all the blockchain nodes 506 forming the authentication/trail-management proxy network 521, which is a blockchain (S1005). Among the blockchain nodes 506, one of the checking nodes executes processing for confirming the block including the first file reading transaction and issues a confirmation notification (S1006).

Upon receiving a notification of issuing the first file reading transaction (S1004) and a confirmation notification for the block corresponding thereto (S1006), the blockchain app 511 operating within the client terminal 504 executes the following processing. The blockchain app 511 issues a portal file request in which the hash value (address information) of the portal file included in the first file reading transaction is specified, to the distributed file sharing app 512 within the client terminal 504 (S1007).

In response to the portal file request, the distributed file sharing app 512 accesses the distributed file sharing network 522 by using the hash value of the portal file so as to obtain the portal file, and then sends the portal file to the blockchain app 511 within the client terminal 504 (S1008). The blockchain app 511 then sends the content of the portal file to the transaction issuing app 510 within the client terminal 504 (S1008). As a result, a list of service names, file names, and hash values (address information) of event information files, such as that illustrated in FIG. 8, is displayed on a display (not illustrated) of the client terminal 504, so that the user may read the portal file.

The user of the client terminal 504 then specifies the hash value of an event information file associated with one of the service names while viewing this list on the display. Then, the transaction issuing app 510 within the client terminal 504 issues a second file reading transaction including the hash value (address information) of the event information file specified by the file reading request generated in the client terminal 504 and the hash value of the service approved transaction obtained in S1003 (S1009). At this time, the transaction issuing app 510 sets the user ID of the client terminal 504 and information on the public key corresponding thereto, in the second file reading transaction as issuer information. As destination information, the transaction issuing app 510 sets the predetermined user ID or group ID assigned to a service of file registration processing and information on the public key corresponding thereto, in the second file reading transaction.

A notification including this second file reading transaction is sent to all the blockchain nodes 506 forming the authentication/trail-management proxy network 521, which is a blockchain (S1010). Among the blockchain nodes 506, one of the checking nodes executes confirmation processing for the block including the received second file reading transaction and issues a confirmation notification (S1011).

Upon receiving a notification of issuing the second file reading transaction (S1009) and a confirmation notification for the block corresponding thereto (S1011), the blockchain app 511 operating within the client terminal 504 executes the following processing. The blockchain app 511 issues a file request in which the hash value (address information) of the event information file included in the second file reading transaction is specified, to the distributed file sharing app 512 within the client terminal 504 (S1012).

In response to this file request, the distributed file sharing app 512 accesses the distributed file sharing network 522 by using the hash value of the event information file to obtain the event information file, and then sends the event information file to the blockchain app 511 within the client terminal 504 (S1013). The blockchain app 511 then sends the content of the event information file to the transaction issuing app 510 within the client terminal 504 (S1013). As a result, the content of the event information file is displayed on a display (not illustrated) of the client terminal 504, so that the user may read the event information file.

Details of an example of the data format of the transaction used in file access processing in FIG. 10 will be discussed below with reference to FIG. 11.

The first or second file reading transaction issued by the transaction issuing app 510 of the client terminal 504 in S1004 or S1009 in FIG. 10 has a data format, such as that illustrated in FIG. 11. As illustrated in FIG. 11, in the file reading transaction, the hash value of the service approved transaction supplied to the transaction issuing app 510 in S1003 is set as the input transaction used in the blockchain. In the file reading transaction, the hash value (address information) of a portal file or an event information file corresponding to a request for reading a portal file or an event information file, which is generated in the client terminal 504, is also set. In the file reading transaction, the user ID (indicated by "user ID #W" in FIG. 11) of the client terminal 504 and information on the public key corresponding thereto are set as issuer information. In the file reading transaction, the user ID (indicated by "user ID #Y" in FIG. 11) or the group ID (indicated by "group ID #Z" in FIG. 11) assigned to a service of file registration processing and information on the public key corresponding thereto are also set as destination information. This user ID or group ID is the same as that assigned to the service for the file registration processing illustrated in FIGS. 7A through 7D.

According to the above-described file access processing, it is possible to implement authentication and trail information management related to file access in a distributed file system on the distributed file sharing network 522 by utilizing the function of a blockchain. The trail information may be used for service billing.

The transaction issuing app 510 may wait to issue a file reading transaction until the user obtains a requested file. The transaction issuing app 510 may issue a file reading transaction after checking that the user has obtained the file.

Figure 12:
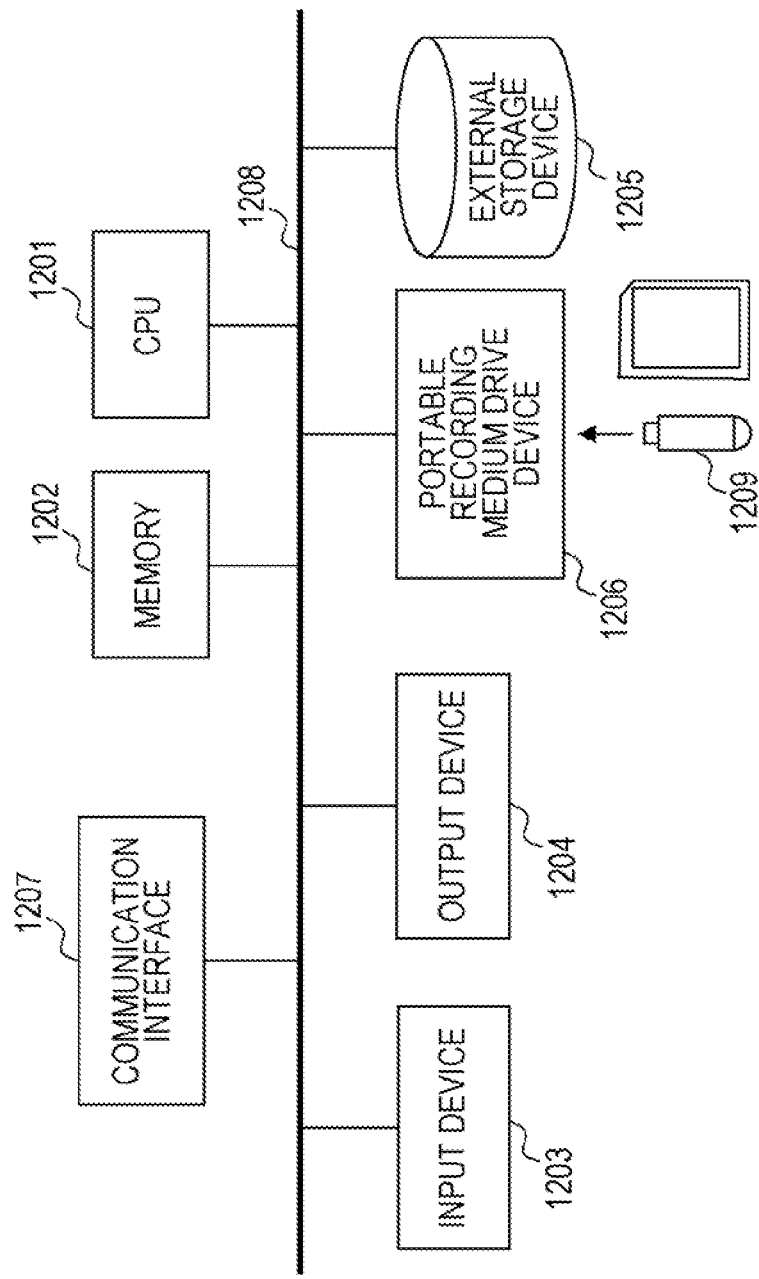
FIG. 12 is a diagram illustrating an example of a hardware configuration, according to an embodiment.

FIG. 12 illustrates an example of the hardware configuration of a computer that may implement the functions of the IoT gateway/client terminal 503 or the client terminal 504 illustrated in FIG. 5 as software processing.

The computer illustrated in FIG. 12 includes a central processing unit (CPU) 1201, a memory 1202, an input device 1203, an output device 1204, an external storage device 1205, a portable recording medium drive device 1206 in which a portable recording medium 1209 may be stored, and a communication interface 1207. These elements are coupled to each other via a bus 1208. The configuration illustrated in FIG. 12 is an example of a computer that may implement the functions of the IoT gateway/client terminal 503 or the client terminal 504. Such a computer is not restricted to this configuration.

The CPU 1201 controls the entirety of the computer. The memory 1202 is a random access memory (RAM), for example, which temporarily stores a program or data stored in the external storage device 1205 (or the portable recording medium 1209) when executing the program or updating the data. The CPU 1201 controls the entirety of the computer by reading a program stored in the external storage device 1205 (or the portable recording medium 1209) into the memory 1202 and executing the read program.

The input device 1203 detects an input operation performed by a user using a keyboard or a mouse, and informs the CPU 1201 of the detection results.

The output device 1204 outputs received data to a display or a printer under the control of the CPU 1201.

The external storage device 1205 is a hard disk drive, for example, and is mainly used for storing various items of data and programs.

The portable recording medium drive device 1206 is used for storing the portable recording medium 1209, such as a secure digital (SD) card, CompactFlash (registered trademark), a compact disc-read only memory (CD-ROM), a digital versatile disc (DVD), and an optical disc, and serves as an auxiliary storage device for the external storage device 1205.

The communication interface 1207 is a device for coupling to a communication network, such as a local area network (LAN) or a wide area network (WAN).

Figure 13:
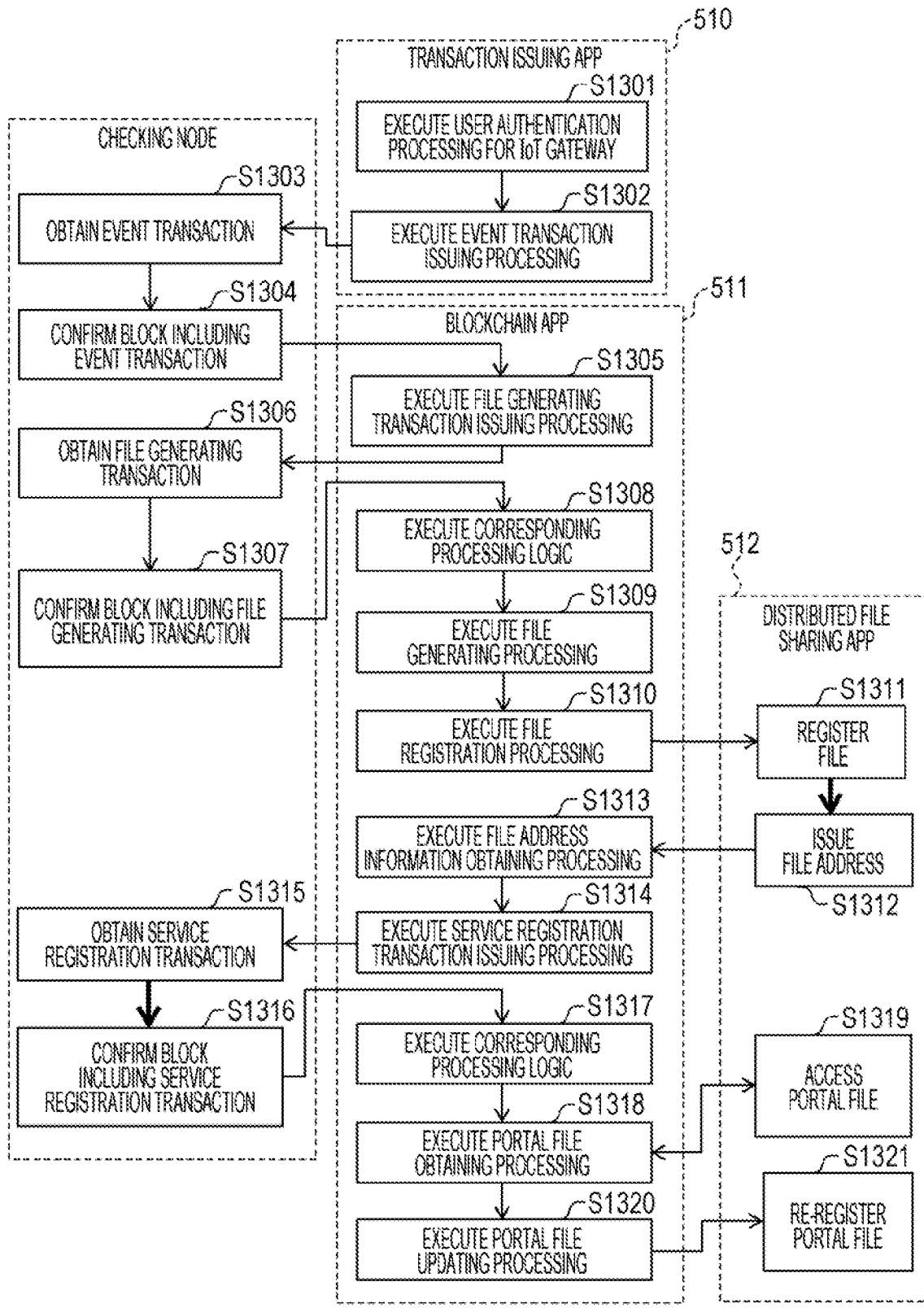
FIG. 13 is a diagram illustrating an example of an operational flowchart for file issuing processing, according to an embodiment.
Figure 14:
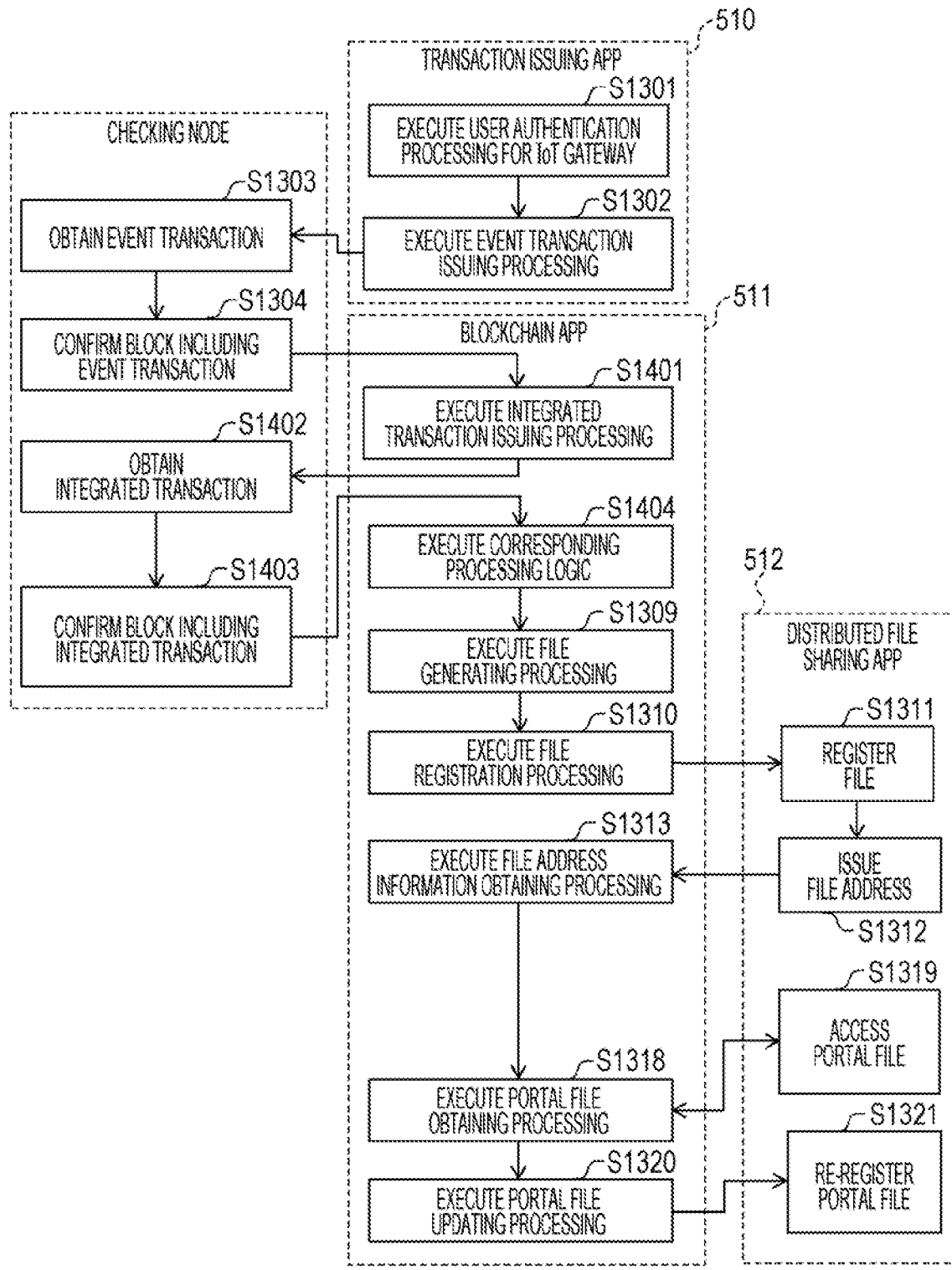
FIG. 14 is a diagram illustrating an example of an operational flowchart for file issuing processing, according to an embodiment.
Figure 15:
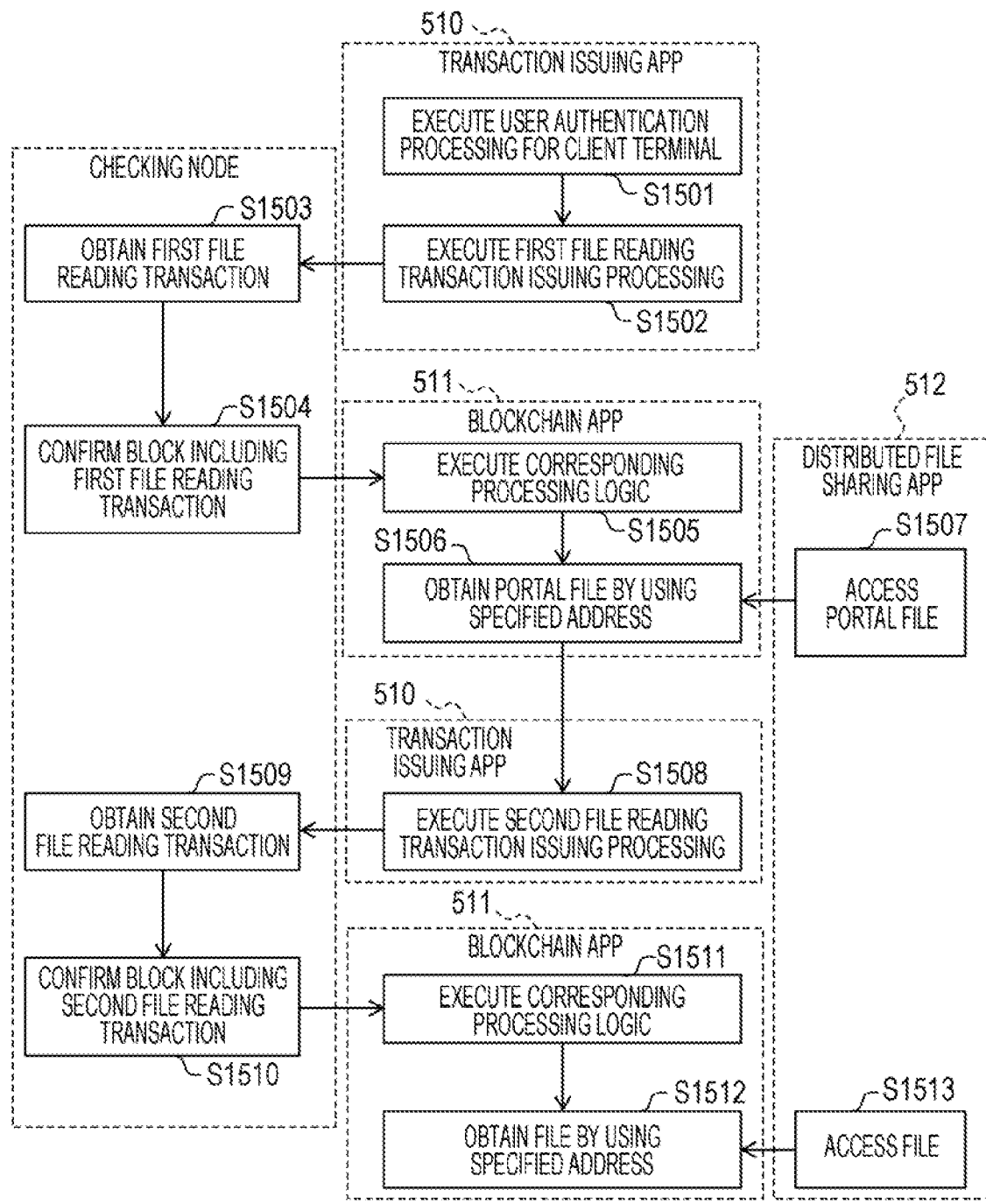
FIG. 15 is a diagram illustrating an example of an operational flowchart for file access processing, according to an embodiment.

The functions of the IoT gateway/client terminal 503 or the client terminal 504 illustrated in FIG. 5 are implemented as a result of the CPU 1201 executing a program describing the functions represented by the flowcharts of FIGS. 13 through 15. This program may be recorded in the external storage device 1205 or the portable recording medium 1209 and be distributed, or may be obtained from a network by using the communication interface 1207.

FIG. 13 is a flowchart illustrating an example of file issuing processing and an example of checking processing executed in association with this file issuing processing when the IoT gateway/client terminal 503 is implemented as a computer having the hardware configuration illustrated in FIG. 12. The processing illustrated in FIG. 13 is file issuing processing in the IoT gateway/client terminal 503 indicated by the sequence diagram of FIG. 6 and executed by a computer having the hardware configuration illustrated in FIG. 12. This processing is implemented as a result of the CPU 1201 in FIG. 12 executing a file issuing processing program loaded into the memory 1202 from the external storage device 1205, for example.

Steps S1301 and S1302 in FIG. 13 are processing executed by the transaction issuing app 510 installed in the IoT gateway/client terminal 503 illustrated in FIG. 5. Steps S1305, S1308 through S1310, and S1313 and S1314 in FIG. 13 are processing executed by the blockchain app 511 installed in the IoT gateway/client terminal 503 illustrated in FIG. 5. Steps S1311 and S1312 and S1319 and S1321 in FIG. 13 are processing executed by the distributed file sharing app 512 installed in the IoT gateway/client terminal 503 illustrated in FIG. 5. Steps S1303 and S1304, S1306 and S1307, and S1315 and S1316 in FIG. 13 are processing executed by the CPU (not illustrated) of a checking node.

The CPU 1201 first executes user authentication processing for the IoT gateway/client terminal 503 (step S1301). This processing is known authentication processing executed by a blockchain, and corresponds to S601 through S603 in the sequence diagram of FIG. 6.

Then, the CPU 1201 executes event transaction issuing processing (step S1302). This processing corresponds to S604 in the sequence diagram of FIG. 6.

As a result of executing step S1302, the CPU 1201 sends a transaction notification to a checking node (S605 of FIG. 6) on the authentication/trail-management proxy network 521 (see FIG. 5) on the LAN via the communication interface 1207. In response to the transaction notification, the CPU of the checking node obtains the event transaction (step S1303), confirms the block including the event transaction, and returns a confirmation notification to the IoT gateway/client terminal 503 (step S1304). This processing corresponds to S606 in the sequence diagram of FIG. 6.

Upon receiving the confirmation notification via the communication interface 1207, the CPU 1201 of the IoT gateway/client terminal 503 executes file generating transaction issuing processing (step S1305). This processing corresponds to S607 in the sequence diagram of FIG. 6.

As a result of executing step S1305, the CPU 1201 sends a transaction notification to a checking node (S608 of FIG. 6) on the authentication/trail-management proxy network 521 (see FIG. 5) on the LAN via the communication interface 1207. In response to the transaction notification, the CPU of the checking node obtains the file generating transaction (step S1306), confirms the block including the file generating transaction, and returns a confirmation notification to the IoT gateway/client terminal 503 (step S1307). This processing corresponds to S609 in the sequence diagram of FIG. 6.

Upon receiving the confirmation notification via the communication interface 1207, the CPU 1201 of the IoT gateway/client terminal 503 starts to execute a processing logic to be executed for the file generating transaction corresponding to the confirmed block (step S1308).

In this processing logic, the CPU 1201 first executes file generating processing (step S1309). This processing corresponds to S610 in the sequence diagram of FIG. 6.

In this processing logic, the CPU 1201 then executes file registration processing (step S1310). This processing corresponds to S611 in the sequence diagram of FIG. 6.

As a result, the CPU 1201 executes processing for registering an event information file in the distributed file sharing network 522 on the LAN via the communication interface 1207 (step S1311). This processing corresponds to S611 in the sequence diagram of FIG. 6.

As a result of executing step S1311, the CPU 1201 issues the hash value of the event information file as address information (step S1312). The CPU 1201 then obtains the issued address information and stores the same in the memory 1202 (step S1313). Steps S1312 and S1313 correspond to S612 in the sequence diagram of FIG. 6.

Then, the CPU 1201 executes service registration transaction issuing processing (step S1314). This processing corresponds to S613 in the sequence diagram of FIG. 6.

As a result of executing step S1314, the CPU 1201 sends a transaction notification to a checking node (S614 of FIG. 6) on the authentication/trail-management proxy network 521 (see FIG. 5) on the LAN via the communication interface 1207. In response to the transaction notification, the CPU of the checking node obtains the service registration transaction (step S1315), confirms the block including the service registration transaction, and returns a confirmation notification to the IoT gateway/client terminal 503 (step S1316). This processing corresponds to S615 in the sequence diagram of FIG. 6.

Upon receiving the confirmation notification via the communication interface 1207, the CPU 1201 of the IoT gateway/client terminal 503 starts to execute a processing logic to be executed for the service registration transaction corresponding to the confirmed block (step S1317).

In this processing logic, the CPU 1201 first executes portal file obtaining processing by using the blockchain app 511 (step S1318). The CPU 1201 then executes the distributed file sharing app 512 to access the portal file on the distributed file sharing network 522 and to obtain the portal file (step S1319). Steps S1318 and S1319 correspond to S616 in the sequence diagram of FIG. 6.

In the above-described processing logic, the CPU 1201 then executes portal file updating processing (step S1320). More specifically, the CPU 1201 executes the blockchain app 511 to add information that includes the hash value (address information) of the event information file obtained in step S1313 in association with the service content of the event information file, to the obtained portal file. The CPU 1201 updates the portal file in this manner. Thereafter, the CPU 1201 shifts the execution from the blockchain app 511 to the distributed file sharing app 512. The CPU 1201 re-registers the portal file updated in step S1320 in the distributed file sharing network 522 (step S1321). Steps S1320 and S1321 correspond to S617 in the sequence diagram of FIG. 6.

As a result of a computer having the hardware configuration illustrated in FIG. 12 executing file issuing processing indicated by the flowchart of FIG. 13, file issuing processing indicated by the sequence diagram of FIG. 6 and executed by the IoT gateway/client terminal 503 is implemented.

FIG. 14 is a flowchart illustrating another example of file issuing processing and an example of checking processing executed in association with this file issuing processing when the IoT gateway/client terminal 503 is implemented as a computer having the hardware configuration illustrated in FIG. 12. The processing illustrated in FIG. 14 is file issuing processing in the IoT gateway/client terminal 503 indicated by the sequence diagram of FIG. 9 and executed by a computer having the hardware configuration illustrated in FIG. 12. This processing is implemented as a result of the CPU 1201 in FIG. 12 executing a web issuing processing program loaded into the memory 1202 from the external storage device 1205, for example.

In the example of file issuing processing in FIG. 13, two transactions are issued in addition to the event transaction issued in step S1302 in accordance with the example of file issuing processing discussed with reference to the sequence diagram of FIG. 6. One of these two transactions is the file generating transaction issued in step S1305 for executing file generating processing in step S1309 and file registration processing in steps S1310 and S1311. The other transaction is the service registration transaction issued in step S1314 for executing service registration processing in steps S1318 through S1321. The example of file issuing processing in FIG. 14 is different from that in FIG. 13 in that a series of the above-described processing steps (steps S1309 through S1311 and S1318 through S1321) are sequentially executed in response to the confirmation of a block including one transaction, in accordance with the example of file issuing processing discussed with reference to the sequence diagram of FIG. 9.

In FIG. 14, steps designated by the same step numbers as those in FIG. 13 are the same processing as those in FIG. 13. Steps different from those in FIG. 13 will be discussed below.

Upon receiving a confirmation notification for the block including the event transaction (step S1304) as in processing in FIG. 13, the CPU 1201 executes integrated transaction issuing processing (step S1401) by using the blockchain app 511. This processing corresponds to S901 in the sequence diagram of FIG. 9.

As a result of executing step S1401, the CPU 1201 sends a transaction notification to a checking node (S902 of FIG. 9) on the authentication/trail-management proxy network 521 (see FIG. 5) on the LAN via the communication interface 1207. In response to the transaction notification, the CPU of the checking node obtains the integrated transaction (step S1402), confirms the block including the integrated transaction, and returns a confirmation notification to the IoT gateway/client terminal 503 (step S1403). This processing corresponds to S903 in the sequence diagram of FIG. 9.

Upon receiving the confirmation notification via the communication interface 1207, the CPU 1201 of the IoT gateway/client terminal 503 starts to execute a processing logic to be executed for the integrated transaction corresponding to the confirmed block (step S1404).

In this processing logic, the CPU 1201 executes a series of steps S1309 through S1313 similar to those in FIG. 13, and then sequentially executes a series of steps S1318 through S1321 similar to those in FIG. 13. This corresponds to processing for sequentially executing a series of steps S610 through S612 and a series of steps S616 and S617 in FIG. 9.

As a result of a computer having the hardware configuration illustrated in FIG. 12 executing file issuing processing indicated by the flowchart of FIG. 14, web issuing processing indicated by the sequence diagram of FIG. 9 and executed by the IoT gateway/client terminal 503 is implemented.

FIG. 15 is a flowchart illustrating an example of file access processing and an example of checking processing executed in association with this file access processing when the client terminal 504 is implemented as a computer having the hardware configuration illustrated in FIG. 12. The processing illustrated in FIG. 15 is file access processing in the client terminal 504 indicated by the sequence diagram of FIG. 10 and executed by a computer having the hardware configuration illustrated in FIG. 12. This processing is implemented as a result of the CPU 1201 in FIG. 12 executing a file access processing program loaded into the memory 1202 from the external storage device 1205, for example.

Steps S1501 and S1502 and S1508 in FIG. 15 are processing executed by the transaction issuing app 510 installed in the client terminal 504 illustrated in FIG. 5. Steps S1505 and S1506 and S1511 and S1512 in FIG. 15 are processing executed by the blockchain app 511 installed in the client terminal 504 illustrated in FIG. 5. Steps S1507 and S1513 in FIG. 15 are processing executed by the distributed file sharing app 512 installed in the client terminal 504 illustrated in FIG. 5. Steps S1503 and S1504 and S1509 and S1510 in FIG. 15 are processing executed by the CPU (not illustrated) of a checking node.

The CPU 1201 first executes user authentication processing for the client terminal 504 (step S1501). This processing is known authentication processing executed by a blockchain, and corresponds to S1001 through S1003 in the sequence diagram of FIG. 10.

Then, the CPU 1201 executes first file reading transaction issuing processing (step S1502). This processing corresponds to S1004 in the sequence diagram of FIG. 10.

As a result of executing step S1502, the CPU 1201 sends a transaction notification to a checking node (S1005 of FIG. 10) on the authentication/trail-management proxy network 521 (see FIG. 5) on the LAN via the communication interface 1207. In response to the transaction notification, the CPU of the checking node obtains the first file reading transaction (step S1503), confirms the block including the first file reading transaction, and returns a confirmation notification to the client terminal 504 (step S1504). This processing corresponds to S1006 in the sequence diagram of FIG. 10.

Upon receiving the confirmation notification via the communication interface 1207, the CPU 1201 of the client terminal 504 starts to execute a processing logic to be executed for the first file reading transaction corresponding to the confirmed block (step S1505).

In this processing logic, the CPU 1201 first executes portal file requesting processing for causing the blockchain app 511 to issue a portal file request to the distributed file sharing app 512 within the client terminal 504 by using the hash value (address information) of a portal file (step S1506). As the hash value (address information) of the portal file, the hash value specified in the first file reading transaction is used. This processing corresponds to S1007 in the sequence diagram of FIG. 10.

As a result of executing step S1506, by using the distributed file sharing app 512, the CPU 1201 accesses the distributed file sharing network 522 by using the above-described hash value so as to obtain the portal file (steps S1506 and S1507) and sends it to the transaction issuing app 510 via the blockchain app 511. As a result, a list of service names, file names, and hash values (address information) of event information files, such as that illustrated in FIG. 8, is displayed on a display (not illustrated) of the client terminal 504, so that the user may read the portal file. This processing corresponds to S1008 in the sequence diagram of FIG. 10.

The user of the client terminal 504 then specifies the hash value of an event information file associated with one of the service names while viewing this list on the display. Then, by using the transaction issuing app 510, the CPU 1201 executes second file reading transaction issuing processing for issuing a second file reading transaction including the hash value (address information) of the event information file specified by a file reading request generated in the client terminal 504 (step S1508). This processing corresponds to S1009 in the sequence diagram of FIG. 10.

As a result of executing step S1508, the CPU 1201 sends a transaction notification to a checking node (S1010 of FIG. 10) on the authentication/trail-management proxy network 521 (see FIG. 5) on the LAN via the communication interface 1207. In response to the transaction notification, the CPU of the checking node obtains the second file reading transaction (step S1509), confirms the block including the second file reading transaction, and returns a confirmation notification to the client terminal 504 (step S1510). This processing corresponds to S1011 in the sequence diagram of FIG. 10.

Upon receiving the confirmation notification via the communication interface 1207, the CPU 1201 of the client terminal 504 starts to execute a processing logic to be executed for the second file reading transaction corresponding to the confirmed block (step S1511).

In this processing logic, the CPU 1201 first executes file requesting processing within the client terminal 504 for causing the blockchain app 511 to issue a file request to the distributed file sharing app 512 by using the hash value (address information) of the event information file (step S1512). As the hash value (address information) of the event information file, the hash value specified in the second file reading transaction is used. This processing corresponds to S1012 in the sequence diagram of FIG. 10.

As a result of executing step S1512, by using the distributed file sharing app 512, the CPU 1201 accesses the distributed file sharing network 522 by using the hash value so as to obtain the event information file (steps S1512 and S1513) and sends it to the transaction issuing app 510 via the blockchain app 511. As a result, the content of the event information file is displayed on a display (not illustrated) of the client terminal 504, so that the user may read the event information file. This processing corresponds to S1013 in the sequence diagram of FIG. 10.

As described above, in this embodiment, by using a blockchain, information related to an event generated in a terminal is shared among node devices included in a distributed file sharing network which is an example of a distributed data sharing network. Then, a file describing this information related to the event is generated and is stored in one of the node devices included in the distributed file sharing network. This makes it possible to construct a highly secure file sharing space, which is a closed network space, in a distributed file sharing system. In this embodiment, in response to a request to register an event information file based on output from a sensor within the IoT gateway/client terminal 503 or input into the IoT gateway/client terminal 503 or a request to read a file from the client terminal 504, the following control operation is executed. In response to this request, the IoT gateway/client terminal 503 or the client terminal 504 executes the blockchain app 511. The blockchain app 511 then executes the distributed file sharing app 512 to cause it to register or access an event information file in the distributed file sharing network 522. In this case, the blockchain app 511 operating in the IoT gateway/client terminal 503 or the client terminal 504 executes processing for conducting user/group authentication, guaranteeing the uniqueness of the content, service repository management, file data/access log management, and file access control. This achieves highly secure registration of or access to an event information file or access to a portal file in the distributed file sharing network 522.

More specifically, in this embodiment, the function of authenticating a user or a group in a distributed file sharing network is provided by using the authentication function provided in a blockchain.

In this embodiment, in file generating processing, the hash value of an event transaction is embedded into an event information file as identification information for guaranteeing the uniqueness of the content. It is thus possible to provide the function of guaranteeing the uniqueness of the content of an event information file on a distributed file sharing network.

In this embodiment, information indicating the association between the service content and address information of event information files registered in a distributed file sharing network is registered in a portal file on the distributed file sharing network. It is thus possible to provide the repository function of performing centralized management of the relationship between services and addresses of event information files on the distributed file sharing network.

In this embodiment, the process of registration of or access to an event information file is recorded in a blockchain. It is thus possible to provide the trail management function of recording a data log related to registering of a file or recording an access log related to accessing to a file in a distributed file sharing network.

As described above, in this embodiment, a distributed file sharing network, such as a distributed web system using IPFS, may be integrated into a robust network space constituted by a blockchain. It is thus possible to implement a simple and secure IoT gateway/client terminal that is capable of providing, as a file service, a great volume of sensor information output from an IoT gateway or a great volume of input into a client terminal. Further, in the above described embodiments, a distributed file sharing network is used as an example of a distributed data sharing network, but the embodiments may be applied to various types of data including a file.

One of the use cases to which this embodiment is applicable may be a system which senses the state of "things" in a supply chain and records information related to the occurrence of "incidents", such as abnormalities, and opens this information to public.

More specifically, in this embodiment, a self-organizing network that is capable of providing, as a file service, sensor information output to an IoT gateway or input into a client terminal is implemented only by peer-to-peer communication between IoT gateways/client terminals.

In this embodiment, the security function of conducting user authentication, guaranteeing the uniqueness of the content including the data copyright, and managing access trail, for example, is achieved by applying and extending the blockchain technology, thereby implementing a distributed security platform which creates a robust closed space.

The communication system in this embodiment enables a small start unit of a specific business or organization to develop into a service co-creation location linking multiple businesses or organizations. It is thus possible to implement an IoT information co-creation space developed from a small start unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable storage medium storing a program that causes a processor included in an apparatus to execute a process, the process comprising:
   sharing information, regarding data owned by a terminal, in a distributed file sharing network including a plurality of apparatuses in which the apparatus is included;
   acquiring an address information based on information which is acquired from a blockchain network different from the distributed file sharing network, the address information indicating specific data among the data which have been shared in the distributed file sharing network;
   issuing a transaction in the blockchain network as a file data-reading transaction, the file data-reading transaction including the address information used for accessing the specified data by the apparatus;
   receiving the specified data, from the distributed file sharing network, based on the shared information and the address information by the issuing of the transaction in the blockchain network as the file data-reading transaction;
   issuing another file data-reading transaction including another address information of a portal file; and
   obtaining the portal file by specifying the another address information included in the another file data-reading transaction,
   wherein the specified data is included in the portal file, the address information indicates the specified data included in the portal file, and the address information is acquired after acquiring the portal file.

2. The non-transitory computer-readable storage medium according to claim 1,
   wherein the information regarding data is shared in the distributed file sharing network by using an approval result in the blockchain network.

3. The non-transitory computer-readable storage medium according to claim 1,
   wherein the information regarding data includes the address information indicating the specified data, and the address information associated with service information corresponding to the specified data is shared as the information regarding data in the distributed file sharing network.

4. The non-transitory computer-readable storage medium according to claim 3, wherein the process further comprises:
   managing, by the blockchain network, a data history of the specified data during sharing the address information of the specified data in the distributed file sharing network.

5. The non-transitory computer-readable storage medium according to claim 3, wherein the process further comprising:
   managing, by the blockchain network, an access history indicating the apparatus access to the distributed file sharing network.

6. A node apparatus comprising:
   a memory; and
   circuitry coupled to the memory and configured to:
   share information, regarding data owned by a terminal, in a distributed file sharing network including a plurality of node apparatuses in which the node apparatus is included;
   acquire an address information based on information which is acquired from a blockchain network different from the distributed file sharing network, the address information indicating specific data among the data which have been shared in the distributed file sharing network;
   issue a transaction in the blockchain network as a file data-reading transaction, the file data-reading transaction including the address information used for accessing the specified data by the node apparatus;
   receive the specified data, from the distributed file sharing network, based on the shared information and the address information by the issuing of the transaction in the blockchain network as the file data-reading transaction;
   issue another file data-reading transaction including another address information of a portal file; and
   obtain the portal file by specifying the another address information included in the another file data-reading transaction,
   wherein the specified data is included in the portal file, the address information indicates the specified data included in the portal file, and the address information is acquired after acquiring the portal file.

7. A communication method comprising:
   sharing information, regarding data owned by a terminal, in a distributed file sharing network including a plurality of apparatuses;
   acquiring an address information based on information which is acquired from a blockchain network different from the distributed file sharing network, the address information indicating specific data among the data which have been shared in the distributed file sharing network;
   issuing a transaction in the blockchain network as a file data-reading transaction, the file data-reading transaction including the address information used for accessing the specified data by an apparatus;
   receiving the specified data, from the distributed file sharing network, based on the shared information and the address information by the issuing of the transaction in the blockchain network as the file data-reading transaction;

issuing another file data-reading transaction including another address information of a portal file;

obtaining the portal file by specifying the another address information included in the another file data-reading transaction; and wherein the specified data is included in the portal file, the address information indicates the specified data included in the portal file, and the address information is acquired after acquiring the portal file.

\* \* \* \* \*